(12) United States Patent
Garcia Morchon et al.

(10) Patent No.: US 12,375,275 B2
(45) Date of Patent: Jul. 29, 2025

(54) MIDDLEBOX VISIBILITY FOR POST QUANTUM KEM

(71) Applicant: KONINKLIJKE PHILIPS N.V., Eindhoven (NL)

(72) Inventors: Oscar Garcia Morchon, Noord-Brabant (NL); Ludovicus Marinus Gerardus Maria Tolhuizen, Waare (NL)

(73) Assignee: Koninklijke Philips N.V., Eindhoven (NL)

(*) Notice: Subject to any disclaimer, the term of this patent is extended or adjusted under 35 U.S.C. 154(b) by 276 days.

(21) Appl. No.: 18/032,195

(22) PCT Filed: Oct. 19, 2021

(86) PCT No.: PCT/EP2021/078875
§ 371 (c)(1),
(2) Date: Apr. 17, 2023

(87) PCT Pub. No.: WO2022/089985
PCT Pub. Date: May 5, 2022

(65) Prior Publication Data
US 2023/0412376 A1    Dec. 21, 2023

(30) Foreign Application Priority Data
Oct. 28, 2020   (EP) .................................. 20204256

(51) Int. Cl.
*H04L 9/32* (2006.01)
*H04L 9/08* (2006.01)
*H04L 9/30* (2006.01)

(52) U.S. Cl.
CPC .............. *H04L 9/30* (2013.01); *H04L 9/0861* (2013.01)

(58) Field of Classification Search
CPC ................................ H04L 9/30; H04L 9/0861
USPC .......................................................... 713/171
See application file for complete search history.

(56) References Cited

U.S. PATENT DOCUMENTS

| | | | |
|---|---|---|---|
| 7,395,549 B1 * | 7/2008 | Perlman | H04L 9/0825 380/279 |
| 9,912,479 B1 * | 3/2018 | Yamada | H04L 9/002 |
| 2020/0259649 A1 * | 8/2020 | Garcia Morchon | H04L 9/0838 |
| 2022/0231843 A1 * | 7/2022 | Garcia Morchon | H04L 9/0844 |
| 2022/0255735 A1 * | 8/2022 | Masny | H04L 9/30 |

OTHER PUBLICATIONS

Naylor et al "Multi-Context TLS (MCTLS) Enabling Secure in Network Functionality in TLS" SIGCOMM Aug. 17-21, 2015.
Barrett "Managing Diffie-Hellman" Sep. 20, 2020 Virtual Workshop On Challenges With Compliance, Operations and Security With TLS 1.3.

(Continued)

*Primary Examiner* — Jeffrey C Pwu
*Assistant Examiner* — Samuel Ambaye

(57) ABSTRACT

Some embodiments are directed to a communication system comprising a one or more clients, a server and a middlebox. The middlebox may access to the multiple short-term server private keys of the server. The middlebox may recover a shared key that is negotiated between server and client by decapsulating encapsulation data using a stored client public key and a server private key from the key storage.

18 Claims, 7 Drawing Sheets

(56) References Cited

OTHER PUBLICATIONS

Reconciligy Forward Secrety With Network Traffic Visiblity in Enterprise Deployments of TLS 1.3.
Dolan-Gavitt et al "Tappan Zee (North Bridge) Miing Memory Accesses for Introspection" Computer and Communications Security, Nov. 4, 2013.
Bhargavan et al "Proving the TLS Handshake Secure(as it is)" ACR Jul. 31, 2014.
Sauvik Bhattacharya et al "SPKEX: an Optimized Lattice Based Key-Exchange" IACR, Aug. 17, 2017.
Schwabe et al "Post-Quantum TLS Without Handshake Signatures" IACR, May 7, 2020 p. 1-23.
Cyber: Middlebox Security Protocol: Part 1 MSP Framework and Template Requirements.
Cyber:Middlebox Security Protocol: Part 2: Transport Layer MSP, Profile for Fine Gained Access Control.
Cyber: Middlebox Security Protocol; Part 3 Enterprise Transport Security (Aug. 2019).
Cyber: Middlebox Security Protocol Part 5 Enterprise Network Security.
International Search Report and Written Opinion From PCT/EP2021/078875 Mailed Jan. 20, 2022.
Francisco Corella Reconciling Forward Secrecy With Network Traffic Visibility in Enterprise Deployments of TLS 1.3 Sep. 25, 2020.

\* cited by examiner

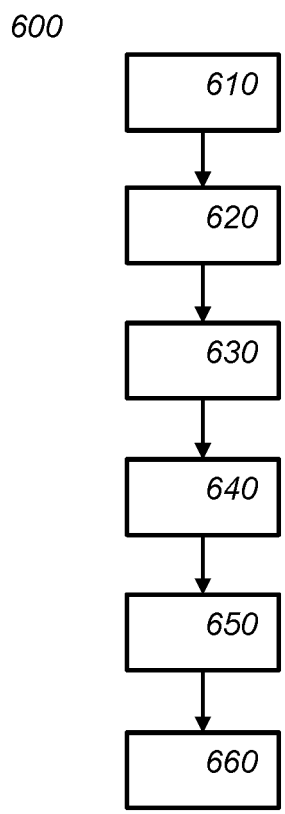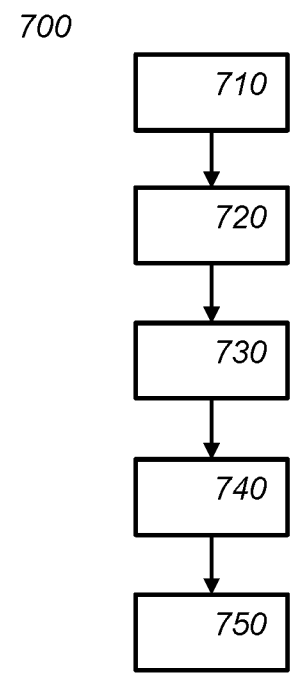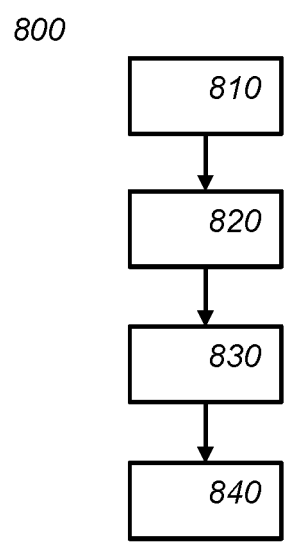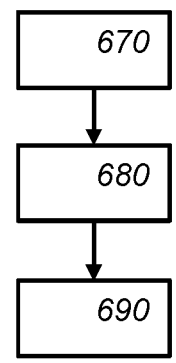
Fig. 6a    Fig. 6b
Fig. 7a    Fig. 7b

MIDDLEBOX VISIBILITY FOR POST QUANTUM KEM

CROSS-REFERENCE TO PRIOR APPLICATIONS

This application is the U.S. National Phase application under 35 U.S.C. § 371 of International Application No. PCT/EP2021/078875, filed on Oct. 19, 2021, which claims the benefit of EP Patent Application No. EP 20204256.0, filed on Oct. 28, 2020 These applications are hereby incorporated by reference herein.

FIELD OF THE INVENTION

The presently disclosed subject matter relates to a middlebox for processing communication between one or more clients and a server, a server for communicating with one or more clients, a middlebox method and a computer readable medium.

BACKGROUND OF THE INVENTION

End-to-end encryption of communication on computer networks is becoming more and more normal as enabled by protocols such as TLS1.3 and IKEv2. While this is beneficial for the end user, it poses challenges to middleboxes. A middlebox is a device or system with access to communications traffic between a client and a server other than network equipment that does not require access to communications traffic beyond the headers of the network packages, e.g., a router, switch or relay. For example, a middlebox may perform functions using, or on, communications traffic between network endpoints. There are many situations in which monitoring of communication between a client and a server is desired. For example, a middlebox might look for security attacks. For example, a middlebox might ensure that data does not leak out from an enterprise.

End-to-end encryption poses a problem for a middlebox since it generally cannot access encrypted information. To resolve this, a middlebox-security protocol has been proposed that allows a middlebox to gain access to the cryptographic key corresponding to the end-to-end encryption, e.g., end-to-end encryption between one of possibly many clients and a server. For example, such a middlebox-security protocol may amend an existing communication protocol, e.g., TLS1.3 and IKEv2. For example, such protocols may be modified to provide the server, also referred to as responder, with a static secret key R. This static secret key may also be provided to a middle box between a client, also referred to as initiator, and server so that the middlebox can decrypt data that is encrypted using the secret server key.

Examples of middlebox security protocols include the Enterprise Transport and Network Security (ETS and ENS) protocols. For example, a known protocol is described in "CYBER; Middlebox Security Protocol; Part 3: Enterprise Transport Security, ETSI TS 103 523-3 V1.3.1 (2019-08); included herein by reference. A central key manager may be used to generate a static Diffie-Hellman key pair and to deploy the key pair to a server as well as to a middlebox. Later, a client and a server may each use a combination of their own private key and the public key received from the other side of the connection to generate a shared secret. Since the middlebox has access to the secret key of the server, it can gain access to the shared key that is negotiated between the client and server. It is noted that the ENS protocol described in part 5 operates in a similar manner; See, CYBER; Middlebox Security Protocol; Part 5: Enterprise Network Security Reference is made to an article dated Sep. 25, 2020 available on https://pomcor.com/2020/09/25/reconciling-forward-secrecy-with-network-traffic-visibility-in-enterprise-deployments-of-tls-1-3 titled "Reconciling Forward Secrecy with Network Traffic Visibility in Enterprise Deployments of TLS 1.3". Reference is further made to a document titled "Managed Diffie-Hellman" available at https://www.nccoe.nist.gov/sites/default/files/8-NCCoE%20Workshop%20August%2013%202020%20 NETSCOUT%20R1.pdf. Reference is also made to the paper "Post-Quantum TLS Without Handshake Signatures", by P. Schwabe et al., version of May 7 2020 available at https://eprint.iacr.org/2020/534. Reference is further made to the paper "Tappan Zee (North) Bridge: Mining Memory Accesses for Introspection" by B. Dolan-Gabitt et al., proceedings CCS 2013. Reference is also made to U.S. Pat. No. 7,395,549 B1.

SUMMARY OF THE INVENTION

The inventors realized that the known middlebox protocol suffers from two combined drawbacks. On the one hand, the choice for Diffie-Hellman means that the protocol is not quantum resistant. On the other hand, the choice for a static key implies it is not straightforward to modify the protocol to be quantum resistant (QR). The inventors realized that a QR protocol typically includes a noise component of some kind. Using a static key in such a situation would allow an attacker to repeatedly perform a key negotiating, each time gaining some information until at some point the protection conferred by the noise component is exhausted. Examples of such attacks are described herein. There is therefore a desire for a communication system, e.g., middlebox, server and client to address these and other issues. Embodiments of middlebox, server and client are described herein.

Apart from not being QR the current middlebox protocols have further limitations. For example, static server key loses the forward secrecy property. Furthermore, also non-lattice or non-QR protocols have a decreased security when used with a static key. For example, with a static key an attacker can more easily use fault attacks, e.g., to extract the static private server key. Moreover, there exist remote timing attacks in which an attacker can derive the static private key obtained from timing measurements. The problem appears to be more severe for QR protocols though as an attacker can learn information on the static server private key, e.g., by sending specially crafted messages.

A middlebox is provided for processing communication between one or more clients and a server. The server uses short-term server private keys and corresponding server public keys. By using short-term keys, e.g., ephemeral keys, the problem of leaking information by repeated use of a static key is addressed. This introduces several complications though.

In an embodiment, the middlebox has a key storage for storing data items indicating multiple short-term server private keys of the server. Client and server derive a key, e.g., the encapsulation key, from a private key and a received public key. As the middlebox can observe client public keys in initiator messages and knows the server private keys, in principle, the middlebox has all the required information to derive the same shared key as the client and server. That is, the middlebox may decapsulate the encapsulation data received from the server using a stored client public key and a server private key from the key storage, obtaining a shared key. Once the shared key is recovered, the middlebox may decrypt further communication between client and server.

However, there are various complications in obtaining the shared key that the client and server may negotiate. Even if the middlebox knows the private keys that the server will use, in practice it cannot be predicted in which order this will happen. Network variation may cause some responder messages to arrive at the middlebox out of order. But even at the server a particular order of usage may be hard to enforce. For example, a server may use multiple workers to handle the connections. These workers operate in parallel and it is not known when a worker will use a particular key. For example, in a typical embodiment of the server, there may be a queue of jobs that are delivered to the workers. As the workers take a different amount of time to execute the jobs that are running in parallel, it is unknown in which order jobs are going to finish and thus which of the potential private keys is used in which connection. Thus, even with a list of the private keys that will be used, the middlebox can only approximately know which exact server private key is used for a given message.

A similar problem occurs for the client public keys. To recover the shared key between client and server, the middlebox may combine the right client public key with the right server private key. However, the middlebox may see initiator messages for more than one client; possibly even a large number of them. Some auxiliary information may be used to identify the right public key, e.g., a source computer network address of a client in an initiator message may correspond to target computer network address in a responder message. This address could be used to match a responder message to a client public key thus reducing the matching problem. Unfortunately, even matching target address in a responder message to a source address in an initiator message, e.g., IP address, may not work perfectly, e.g., if the address is used multiple times, e.g., if a client decides to set-up multiple connections.

These problems may be addressed by verifying that a shared key is correct. For example, the middlebox may be configured to try multiple server private keys and/or multiple stored client public key obtained from multiple initiator messages, thus obtaining multiple possible decapsulations of the encapsulation data. The correct key may be identified as the key that passes a verification. There are various ways in which this can be done, as set out herein.

The middlebox, server and client are electronic devices or systems, e.g., a computer. For example, they may be implemented as middlebox device, server device and client device, and/or middlebox system, server system and client system. The middlebox may run as a so-called network function, possibly a virtual network function, e.g., in a 5G network. Commodity hardware may be configured for such functions. One could implement an embodiment in a virtual machine, in a Docker container, and the like. Multiple network functions may run on the same machine, for example, an embodiment of a middlebox for traffic monitoring may be combined, e.g., with a firewall.

A further aspect is a middlebox, server or client method. These may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

BRIEF DESCRIPTION OF THE DRAWINGS

Further details, aspects, and embodiments will be described, by way of example, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a middlebox, FIG. 1b schematically shows an example of an embodiment of a server, FIG. 1c schematically shows an example of an embodiment of a client, FIG. 1d schematically shows an example of an embodiment of a communication system, FIG. 2a schematically shows an example of an embodiment of a communication system, FIG. 2b schematically shows an example of an embodiment of a communication system, FIG. 2c schematically shows an example of an embodiment of a communication system, FIG. 3 schematically shows an example of an embodiment of a communication system, FIG. 4 schematically shows an example of communication in an embodiment of a communication system, FIG. 5 schematically shows an example of a KEM protocol in an embodiment of a communication system, FIG. 6a schematically shows an example of an embodiment of a middlebox method, FIG. 6b schematically shows an example of an embodiment of a server method, FIG. 7a schematically shows an example of an embodiment of a client method, FIG. 7b schematically shows an example of an embodiment of a middlebox method, FIG. 8a schematically shows a computer readable medium having a writable part comprising a computer program according to an embodiment, FIG. 8b schematically shows a representation of a processor system according to an embodiment.

REFERENCE SIGNS LIST

Figure 1A:
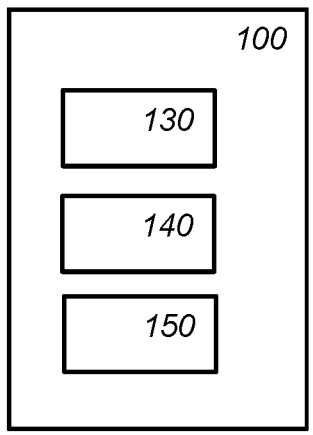

The following list of reference signs refers to FIGS. 1a-4, and is provided for facilitating the interpretation of the drawings and shall not be construed as limiting the claims.

100 a middlebox
130, 230, 330 a processor system
140, 240, 340 storage
150, 250, 350 communication interface
170 a computer network
200 a server
300-303 a client
310 multiple clients
111-113 a middlebox
114 an analyzer 211-213 a server
311-315 a client
322, 323 initiator message
222, 223 responder message
121 an encrypted message
221 a responder message
321 an initiator message
410 an access unit
411 client data
412 a client data storage
430 a matcher
431 a server private key
432 a server private key storage
433 a shared key storage
440 a decryptor
450 an analyzer
500-503 a communication system
100 a system
1000, 1001 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF THE EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

As pointed out in the summary, the known middlebox protocol uses Elliptic-Curve (EC) Diffie-Hellman together with a static key. EC Diffie-Hellman is not QR, but even if EC-Diffie-Hellman were replaced with a QR-DH or QR-KEM, e.g., as currently standardized by NIST, the result would still not be secure, as QR-KEMs, especially QR-KEMs that rely on noise, are not safe when used with a static key. Below attacks are described on an exemplifying lattice-based quantum-resistant version of the ETS protocol due to the usage of a static key. The problems that would occur when employing such a protocol are typical for lattice base cryptography with a static key. The inventors found a middlebox that addresses these problems, and which can, e.g., work with a server that uses short-term keys, in particular ephemeral keys.

In the following, we will explain these attacks in the context of lattice-based QR-KEMs, but similar issues apply to other classes of QR-KEMs. In the following, we assume that the client (initiator) and server (responder) rely on a lattice-based key encapsulation method such as Kyber, Frodo, LAC, SABER, Round5, Threebears, NTRUPrime or NTRU. Descriptions of these protocols are included herein by reference, and can be obtained from the NIST PQ Standardization, see: https://csrc.nist.gov/Projects/post-quantum-cryptography/round-2-submissions In the following, we illustrate the attacks in the context of a Learning with Errors (LWE) key encapsulation mechanism (KEM) similar to Frodo with the exception that the KEM below uses ternary secrets and noise. In this example, KEM, 1. the client samples a seed sigma at random and uses it to compute a matrix A of size d×d and with elements in $Z\_q$ by applying a deterministic random bit generator. The random bit generator may be, e.g., an eXtensible Output Function based on SHA3. The client (client) samples a secret matrix S of size nbar×d and the responder (server) has a secret matrix of size R of size mbar×d. One may consider these matrices to have nbar (mbar) secret vectors of dimension d. For simplicity of the explanation it is assumed that the values of these secret vectors are ternary, i.e., the components can be $\{-1, 0, 1\}$. One may also consider these secret vectors to have a fixed-weight, e.g., they have a fixed number of $\{-1,1\}$. The client computes a public matrix B as SA+E1 (mod q), where E1 is a noisy matrix of size nbar×d and the components of E1 are small. For this explanation, one may again assume that these secrets are ternary as well. The client sends B and sigma to the server.
2. The server generates a random secret R and computes U=AR^T+E2 (mod q) as well as V=BR^T+E3+Kq/2 (mod q) where K is a randomly generated binary key matrix, that is having entries that are 0 or 1, that is encapsulated with value BR^T+E3. The responder sends (U,V) to the initiator.
3. The client can then compute value X=SU+E4=S((AR^T)+E2)+E4 and can decapsulate K from K'=V−X.=K q/2+(E1R^T−SE2+E3−E4).

The public object may be a matrix A as above, but may also be a polynomial, e.g., of degree d with coefficients in $Z\_q$, e.g., computed modulo a modulus q and modulo a polynomial, e.g., a cyclotomic polynomial. The underlying computing structure may be a finite field or finite ring, or the like. Like the public object, also the public and private keys may be matrices or polynomials. As shown above, the order of multiplications and/or transposing of elements is chosen so that the encapsulating keys computed at server and client will be approximately equal, that is equal if there were no noise.

The protocol may use such schemes as learning with rounding (LWR), learning with errors (LWE) or NTRU. The usage of a KEM as above ought to be used with a short-term key R, preferably, an ephemeral key R. In fact, IND-CCA KEMs submitted to the NIST competition are featured by a short-term key R and a long-term (static) key S. We note that S can be made static at the client side since IND-CCA KEMs are outfitted with a security transform to resist chosen cipher text attacks that aim at retrieving S. None of the proposed KEMs has any protection fort R.

However, as a motivating example, consider the server uses a static R, rather than an ephemeral one. If this were to happen, the following attacks apply:

Attack 1: consider an attack on ETS or ENS in which E1 is malformed consisting of N_bar secret vectors being all 0s, except in a single value in position i that is a big value e, e.g., q/2. For instance, if nbar=2 and d=4, E1 could have top row

[0,0,e,0] and bottom row [0,0,0,0]][[0, 0, e, 0],[0, 0, 0, 0]]. Now consider that the first vector in the 2×4 matrix R has a non-zero value z in {−1,1} in its third position in the top row [[?, ?, z ?],[?, ?, ?, ?]]. When the server computes now BR^T=(SA+E1)R^T, that big value in E1 will trigger a big error in E1R^T at position [0,0]. Following with the previous example, assume that R has dimension mbar×d=2×4, and W=BR^T has dimension nbar×mbar=2×2, then:

if the top row in R has a non-zero element in position 3, then element W[0,0] will have a big error.
if the bottom row in R has a non-zero element in position 3, then element W[0,1] will have a big error.

If W has errors, this means that the attacker, who is controlling the client (also referred to as the initiator), will observe a decryption failure after decapsulating K. In this case, the attacker can directly learn information about K. This attack can be adapted to other lattice-based schemes relying on LWE, RLWE, MLWE.

Note that an attacker does not need to extract all components of R in this way, but a fraction of them might be enough. Once an attacker has, let's say w components of n, the attacker can use the retrieved components in a lattice attack to obtain the renaming n-w components. The noise generated in Learning with Rounding schemes cannot be manipulated by an attacker, e.g., the noise in Round5 for its non-ring parameters. However, an attacker can add additional noise E1 as described on top of the LWR noise.

Attack 2: Consider an attacker that sends any random sigma to initialize A and a malformed B such that B consists mainly of 0s except a single value at a target position that is set to q/4. The server will then compute V=BR^T+E3+Kq/2. If R contains a 0 at the target position, then the value in V at the target position will be close to either 0 or q/2, though not exactly equal due to the error E3. If R contains a 1 (or −1) at the target position, then the value in V at the target position will be either q/4 or −q/4. This allows the attacker to derive R.

Other attacks seem feasible in lattice-based schemes, as they suffer from the general disadvantage of relying on noise for security. An attacker may have more scope to vary values to suit his needs, as a responder may not always be able to distinguish between noise and a spurious change induced by an attacker. Other QR KEM schemes can also be attacked if static keys are used by the server. For instance, SIKE is a key encapsulation method based on supersingular isogenies for which attacks are known if it is used with a static key. See: Reza Azarderakhsh, at al. "Supersingular Isogeny Key Encapsulation—Submission to the NIST's post-quantum cryptography standardization process" for a description of the SIKE protocol.

We note that the above attacks are relevant for the ETS and ENS protocols but could also be done in a normal version of a security protocol such as TLS, IPSec, etc., in the case of a bad implementation that keeps the server private key constant. This can happen due to implementation mistakes but also on purpose. Consider a security agency (Eve) that introduces a bug in an open source implementation such that the encryption function, executed by the server, of one of the lattice-based KEMs (Kyber, Saber, Frodo, LAC, Round5, . . . ) does not use a random secret R, but it keeps using a same secret R too long or too often. Then Eve can attack the server in a similar way as above. Such a bug may be difficult to detect since the encapsulated key and the encryption key still change. Even if a protocol such as ECDH itself were used, that does not suffer from problems due to static keys, then these allow an attacker to more effectively perform fault injection attacks, e.g., if the attacker has physical access to the server.

Various embodiments of a middlebox, server and/or client are described that address these issues. In particular, embodiments are disclosed in which on the one hand the protocols may be used with no or little modification to the known protocols, but on the other hand also avoid the use of a static key.

Specifically, a middlebox is proposed for processing communication between one or more clients and a server, the one or more clients having a client private key and a corresponding client public key, the server having server private keys and corresponding server public keys, the server private and public key being short-term keys, the middlebox comprising
an interface to access digital communication on a computer network between the one or more clients and the server, a client and the server being configured to execute a key encapsulation protocol to obtain a shared key and to exchange further communication encrypted with the shared key,
a key storage for storing data items indicating multiple short-term server private keys of the server,
a processor system configured to
receive one or more initiator messages of the KEM protocol from the one or more clients, the initiator message comprising the client public key (B) of the corresponding client,
receive one or more responder messages of the KEM protocol from the server for the one or more initiator messages, a responder message comprising a server public key (U) and encapsulation data (V), the server public key (U) corresponding to a short-term server private key (R),
decapsulate the encapsulation data (V) using a stored client public key (Bj) and a server private key (Ri) from the key storage, obtaining a shared key (K),
verify that the shared key is correct and decrypting the further communication between corresponding client and server.

Further, a server is proposed for communicating with one or more clients, the one or more clients having a client private key and corresponding client public key, the server having server private keys and corresponding server public keys, the server private and public keys being short-term keys, the server comprises
an interface configured for digital communication on a computer network between the one or more clients and the server, the digital communication being configured for access by a middlebox, and
a processor system configured to
execute a key encapsulation protocol with the one or more clients to obtain a shared key with the one or more clients and to exchange further communication with the client encrypted with the shared key, executing the key encapsulation protocol comprising one or more iterations of:
receiving an initiator messages of the KEM protocol from a client, an initiator message comprising a client public key (B),
obtaining a current short-term private key,
generating a responder message according to the KEM protocol in response to the received initiator message, a responder message comprising a server public key (U) and encapsulation data (V), the server public key (U) corresponding to the current short-term server private key (R), the responder message further comprising encapsulation data (V) for communicating a shared key, the encapsulation data being encapsulated using the client public key in the initiator message and the current server private key.

Figure 1B:
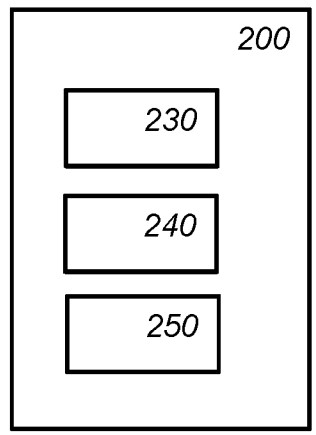
Figure 1C:
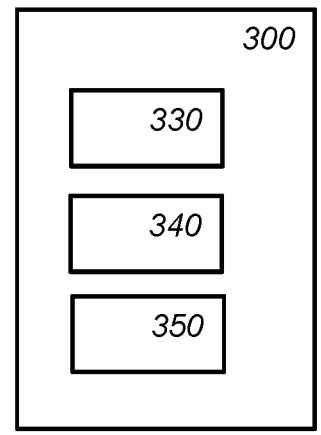
Figure 1D:
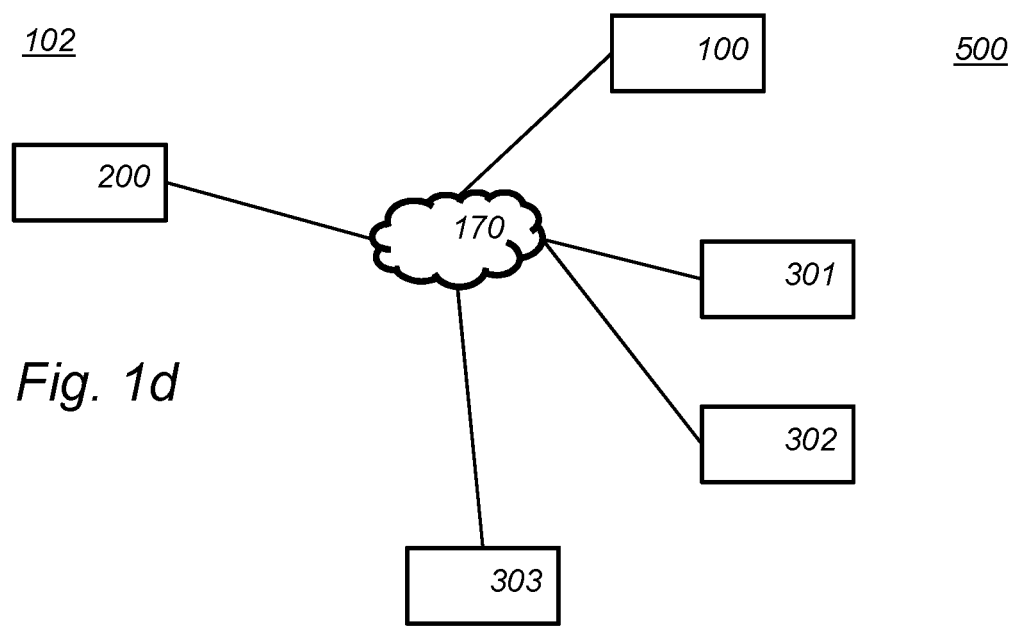

FIG. 1a schematically shows an example of an embodiment of a middlebox 100. FIG. 1b schematically shows an example of an embodiment of a server 200. FIG. 1c schematically shows an example of an embodiment of a client 300. FIG. 1d schematically shows an example of an embodiment of communication system 500. For example, communication system 500 may comprise multiple clients. Shown in FIG. 1d are clients 301-303. Clients 301-303 may be similar to client 300. For example, communication system 500 may comprise a server. For example, there may be one server and multiple clients, but one server and one client, or multiple servers and multiple clients are also possible. The server and the one or more clients are configured to exchange computer network communication over a computer network 170. A middlebox 100 is connected to the computer network to have access to the communication between server and one or more clients. There are various ways to configure the middlebox between the server and the clients, some examples of which are shown herein.

For example, the middlebox 100, server 200 and client 300 may comprise a processor system 130, 230, 330 respectively, a storage 140, 240, 340 respectively, and a communication interface 150, 250, 350, respectively. Storage 140, 240, 340 may comprise local storage, e.g., a local hard drive or electronic memory. Storage 140, 240, 340 may comprise non-local storage, e.g., cloud storage. In the latter case, storage 140, 240, 340 may comprise a storage interface to the non-local storage. For example, middlebox 100 or server 200 may use storage 140 or storage 240 to store data items indicating multiple short-term server private keys of the server, etc. In case of server 200 the multiple short-term server private keys of the server may be used to respond to an initiator message of a client, and to negotiate a shared key with the client. In case of middle box 100, the multiple short-term server private keys of the server may be used to also determine the shared key.

The parties in system 500 may communicate with each other or within themselves over a computer network; for example, the communication may be internally, with other systems, external storage, input devices, output devices, and/or one or more sensors or other uses of the computer network. For example, the computer network may be used to send or receive sensor values, command, instructions for physical machines and so on. The computer network may be an internet, an intranet, a LAN, a WLAN, etc. The computer network may be the Internet. The system comprises a connection interface which is arranged to communicate within the system or outside of the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna.

In middlebox 100, the communication interface 150 may be used to send or receive digital data from one or more of the clients and from server 200. Communication interfaces 250 and 350 may be used to exchange information between them, e.g., engage in a key agreement protocol, e.g., a KEM protocol. The exchanged information may go via middlebox 100, e.g., interface 150, and/or middlebox 100, e.g., interface 150 may have access to it.

The execution of middlebox 100, server 200, client 300 may be implemented in a processor system, e.g., one or more processor circuits, e.g., microprocessors, examples of which are shown herein. The processor system may comprise one or more GPUs and/or CPUs. They may comprise multiple processors, which may be distributed over different locations. For example, middlebox 100, server 200, and client 300 may use cloud computing.

Figure 3:
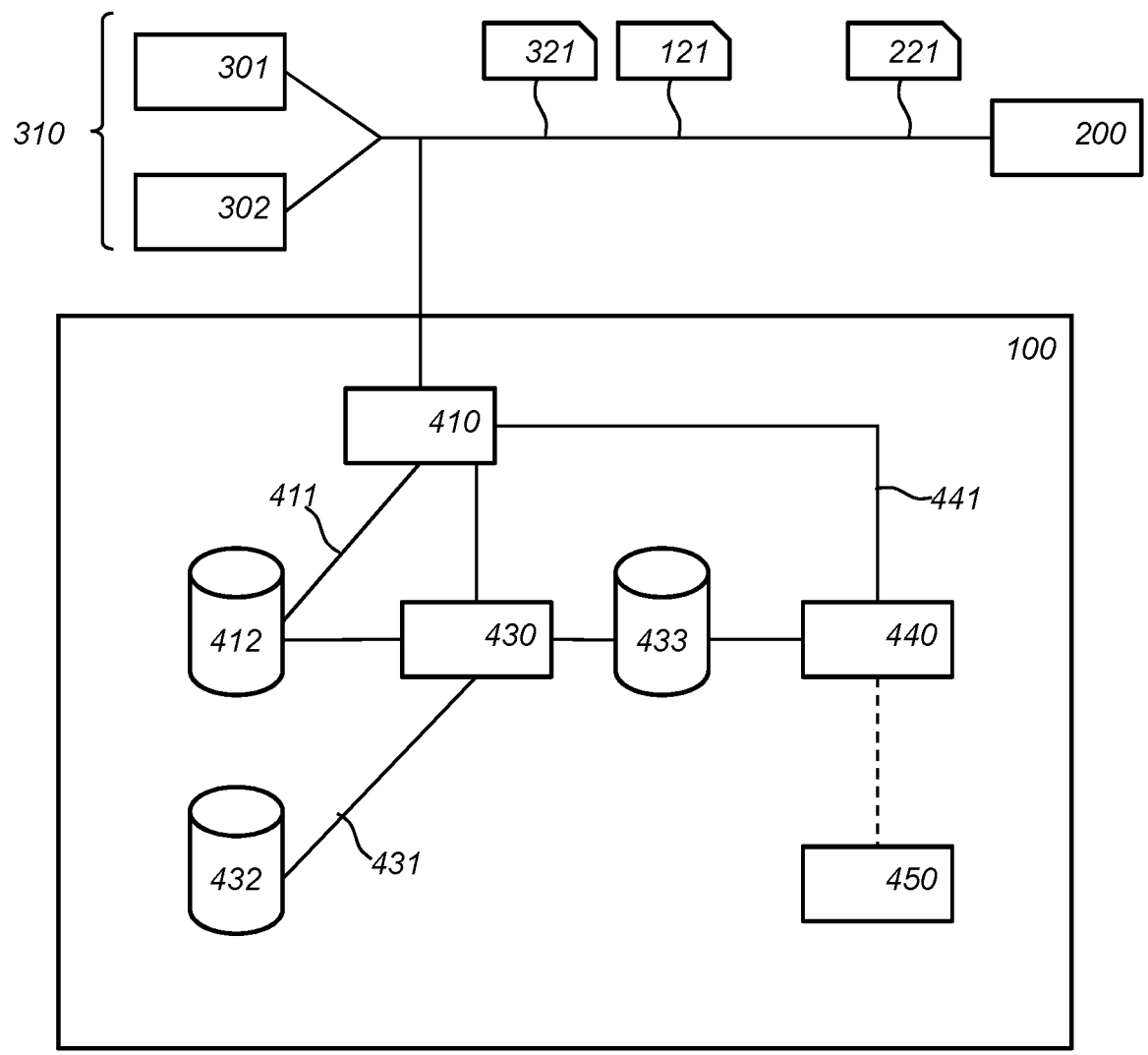

In embodiments herein, reference may be made to functional units of these devices that may be functional units of the processor system. For example, FIG. 3 provides various functional units that may be used as a blueprint of a possible functional organization of the processor system of middle box 100. The processor circuit(s) are not shown separate from the units in this figure. For example, the functional units shown in FIG. 3 may be wholly or partially implemented in computer instructions that are stored at middlebox 100, e.g., in an electronic memory of middlebox 100, and are executable by a microprocessor of middlebox 100. In hybrid embodiments, functional units are implemented partially in hardware, e.g., as coprocessors, e.g., cryptographic coprocessors, and partially in software stored and executed on middlebox 100. The same holds for the server and client—their respective processor systems may be configured to perform the functions described herein.

Figure 2A:
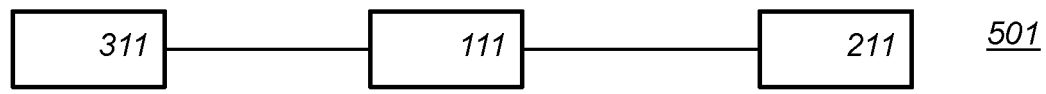

There are various ways in which one or more clients, middlebox and server may be arranged with respect to each other in a computer network. Some examples thereof are described in FIGS. 2a-2c. FIG. 2a schematically shows an example of an embodiment of communication system 501. Communication system 501 comprises a client 311, a middlebox 111 and a server 211. In this example, the middlebox is positioned to receive communication from the client for the server and/or communication from the server for the client. The communication may be passed on, e.g., forwarded towards their destination. The communication may be forwarded unamended; for example, middlebox 111 may use the communication only passively. The communication may be forwarded amended; for example, middlebox 111 may modify or block all or part of the communication. For example, in an embodiment described herein, the server 211 may include additional data intended for middlebox 111. This information may be removed before passing on the communication to the client. For example, middlebox 111 may be combined with a firewall or virus scanner or the like and block unauthorized or suspicious communication.

Figure 2B:
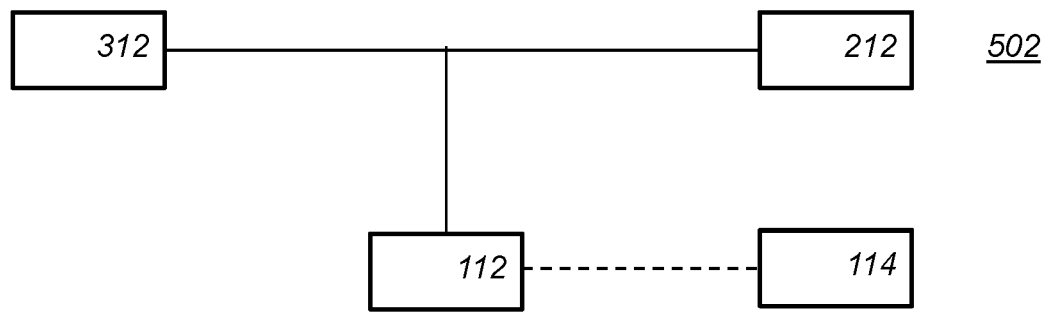

FIG. 2b schematically shows an example of an embodiment of communication system 502. Communication system 502 comprises a client 312, a server 212 and a middlebox 112. In communication system 502, middlebox 112 is arranged to have access to the communication between server 212 and client 312 without having to pass communication on. For example, middlebox 112 may receive a copy of the communication or part thereof, from a network device, e.g., a relay, router or the like. Also shown in FIG. 2b is an optional analyzer 114. For example, middlebox 112 could limit itself to decrypting communication between server and client and forwarding the communication to an analyzer 114. Analyzer 114 is optional or may be combined with middlebox 112. Analyzer 114 may be included in FIGS. 2a or 2c as well.

Figure 2C:
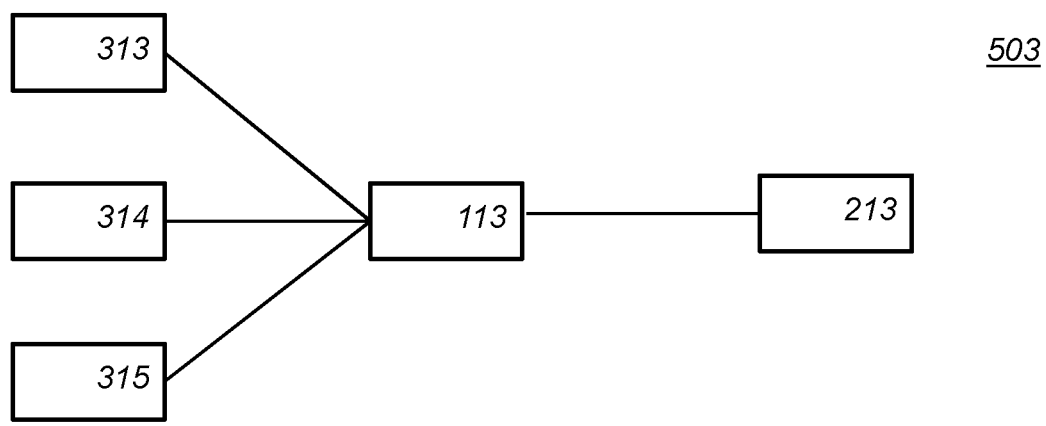

In either example the server may be connected to multiple clients. This is a particularly challenging configuration with ephemeral keys since it is not always clear for a device in an intermediate location what responder and initiator messages correspond to each other. On top of that, a middlebox may not know which server private key was used for which responder message—even if the middlebox knows the list from which the server private key was taken. FIG. 2c shows as an example the system of FIG. 2a extended with multiple clients. FIG. 2b may likewise be modified to multiple clients; For example, middlebox 112 may have access to, e.g., receive a copy of, traffic between multiple clients, e.g., clients 313-315 etc. and the server 212.

FIG. 2c schematically shows an example of an embodiment of communication system 503. Communication system 503 comprises multiple clients, shown are clients 313-315, a server 213 and a middlebox 113.

Furthermore, in each of these examples, e.g., FIGS. 2a, 2b, 2c, the middlebox may be located close to the client, e.g., within an enterprise, LAN network or the like. For example, such a middlebox may be used for applications such as adblocking, data protection, etc. The middlebox may also be located close to the server, e.g., outside of the LAN, enterprise, etc., in which the client is located.

FIG. 3 schematically shows an example of an embodiment of communication system 500. Exemplifying communication system 500 comprises a server 200 and a middlebox 100. Communication system 500 further comprises multiple clients 310; shown are client 301 and client 302. There may be more or fewer clients than shown. Middlebox 100 is configured for processing communication between server 200 and clients 310. FIG. 3 shows two such clients, clients 301 and 302, however, there may be more clients—potentially many more, e.g., 100 clients or more, 1000 clients or more, or even higher numbers. Below reference will be made to multiple clients, with the understanding that the embodiment may also be applied in a situation in which there is only one client, e.g., omitting client 302 from FIG. 3. Likewise, the embodiment will assume that there is a single server, but there may be more servers. For example, an embodiment may be executed for each server but concurrently, e.g., the storage needed for each server may be combined in a single middlebox, the processing needed for each server may be performed by a single middlebox, and so on. For simplicity, the situation with a single server and multiple clients is discussed below—but with the understanding that the embodiment can be modified by a skilled person to situations with multiple servers and multiple clients, multiple servers and a single client, and a single server and a single client.

Clients 310 and server 200 are configured to execute a key encapsulation protocol to obtain a shared key and to exchange further communication encrypted with the shared key. The shared key being shared between the client and the server and is typically a symmetric key. For example, clients and server may be configured to perform a protocol such as TLS, IKEv2, ETS or ENS, or the like, except modified as indicated herein, e.g., modified by in that the server does not use a static key but a short-term key, and so on.

Middlebox 100 is configured with an interface to access digital communication on a computer network between clients 310 and server 200—in particular the communication between clients 301, 302 and server 200. For example, middlebox 100 and communication system 500 may be arranged as indicated for any one of FIGS. 2a, 2b and 2c.

Clients 310 each have a client private key and a corresponding client public key. Server 200 has server private keys and corresponding server public keys, the server private and public key being short-term keys. A short-term key is short-lived, e.g., used a few times or for a short period, e.g., fewer than a threshold number of times, e.g., two or three times; e.g., less than a time period, e.g., a minute, etc. Preferably, the short-term key is an ephemeral key, e.g., used only once. For example, server 200 may use an ephemeral key to perform one key agreement, to negotiate one shared key with one client. For example, a client, say client 301, may send an initiator message 321, e.g., comprising the client public key of the client, say client 301. Server 200 may respond with a responder message 221. For example, responder message 221 may comprise a short-term server public key. For example, the short-term server public key may be used only for this particular responder message 221. Client and server are configured to derive a shared key from the information exchanged in initiator message 321 and responder message 221. For example, a public and private key may be combined into an encapsulation key to encapsulate key material. The shared key may be derived from the key material. Examples of KEM protocols are described herein.

In an embodiment, the key agreement protocol is vulnerable to attacks on a static key. A particular important class of embodiments use a QR protocol. For example, the key agreement protocol may be a key encapsulation protocol in particular a lattice-based protocol. For example, in a class of lattice-based protocols a private key is mapped to a point in a lattice, typically a public lattice. For example, the mapping may add noise, e.g., explicit noise or implicit noise such as a rounding or scaling operation. One example, of a KEM protocol is described with reference to FIG. 5. It is noted that this choice of a KEM protocol is an example, and many details may be changed.

Figure 5:
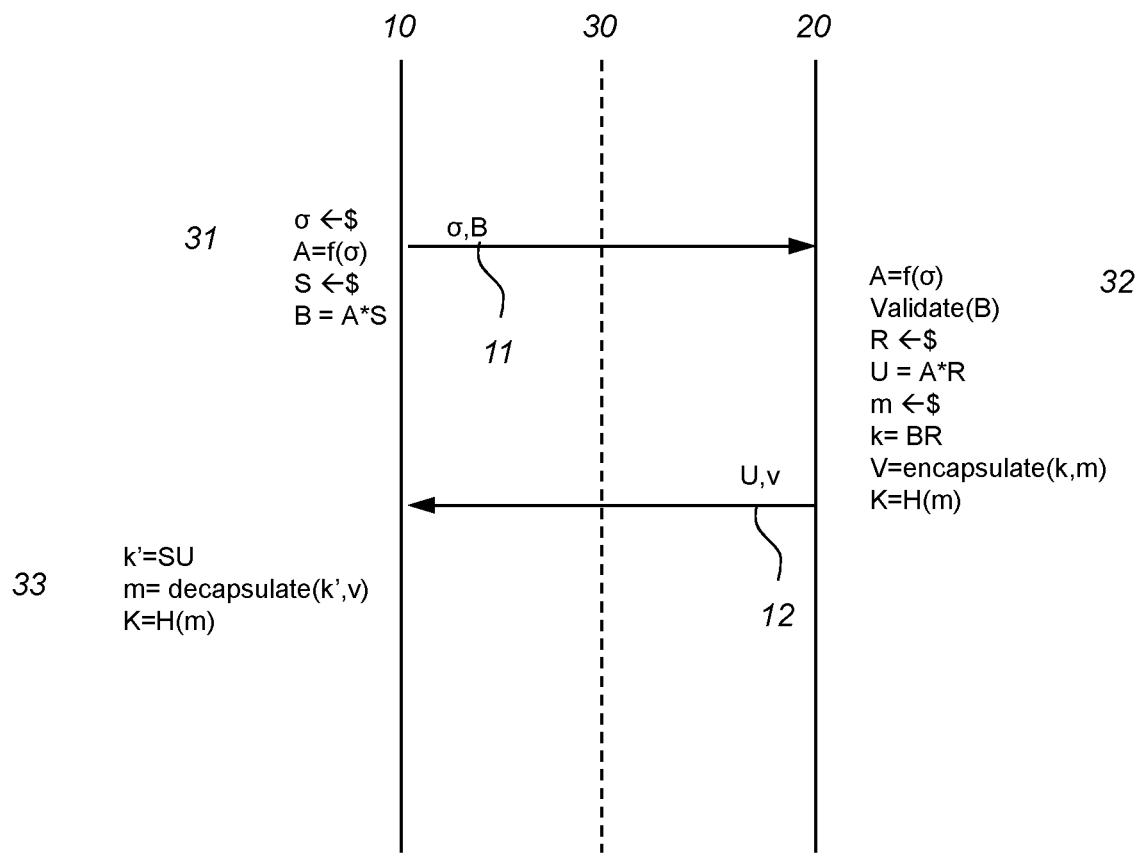

FIG. 5 schematically shows an example of a KEM protocol in an embodiment of a communication system. For example, the protocol may be Round5. Shown in FIG. 5 are a client 10, a middlebox 30, and a server 20.

Shown in part 31, Client 10 is configured to select a seed $\sigma$, e.g., randomly, and to compute a public object A from it, e.g., using a deterministic random number generator. A client private key S is also randomly generated. Public object A and client private key S may be matrices or may be a polynomial. The matrix may have elements taken from a finite field or ring. The polynomial may have coefficient taken from a finite field or ring. The finite ring may be a polynomial ring. For simplicity, we will assume that a matrix implementation is used, but instead the matrices may be replaced by polynomials. From private key S and public object A the client public key B is generated. For example, noisy multiplication between them is performed, e.g., $B=A*S$. A noisy multiplication may be a regular multiplication, e.g., matrix multiplication, polynomial multiplication, but with added noise. Noise may be explicit, e.g., by adding an explicit noise term or implicit, e.g., by rounding or scaling the result. Client 10 sends an initiator message 11 to the server that comprises at least the seed $\sigma$ and public key B. Seed $\sigma$ and public key B may be short-term or long-term.

Shown in part 32, Server 20 computes the public object A from the seed $\sigma$, e.g., using the same deterministic random number generator. Optionally, the server may validate the public key, e.g., to verify that it is sufficiently random. A server private key R is obtained, e.g., selected from a list or generated from a seed, etc. From server private key R and public object A the server public key U is generated, also using a noisy multiplication. Key material is randomly obtained, e.g., generated by a random number generator, or selected from a list, or generated from a seed, or the like. From the client public key and the server private key an encapsulation key k is obtained. This may use the same multiplication, but adding noise is not necessary. Note that the order of multiplication and/or transposing of matrices be inserted as required. The encapsulation key is used to encapsulate the key material m. This may use an encapsulation function. The resulting encapsulated data is termed V. Server public key U and encapsulation data V are returned to the client in a responder message 12. A shared key is computed from the key material m, e.g., by a key derivation function. The client can compute an approximation of the encapsulation key k' from the client private key and the server public key. This encapsulation key may be used to decapsulate the encapsulated data V. From the recovered key material, the shared key K can be computed at the client side.

The encapsulation function has the property that its encapsulated data can be decapsulated with an encapsulation key k' that is close but not identical to the encapsulation key k. There are many variants possible. For example, an encapsulation function may map the key material m to the finite field or ring used, e.g., mapping 1-bits to either 0 or q/2, e.g., if there are q elements in the ground field/ring. In this case, the encapsulation key may be added. The client can subtract its encapsulation key and round the result. The encapsulation key may instead or in addition be mapped to a code word, so that after subtracting the encapsulation key an error correction algorithm may be used. Still other variants are possible.

Round5 is further described in the Round5 submission to NIST PQC standardization, titled "Round5: KEM and PKE based on (Ring) Learning with Rounding" of Friday 10 Apr. 2020 (referred to as 'Round5'), included by reference. Note that Round5 comes in matrix and polynomial variants, both of which are applicable for embodiments.

Returning to FIG. 3. In an embodiment, a short-term key is frequently changed but not necessarily after each responder message. For example, they may be reused a few times, e.g., t=2 times. The effect of this is that the matching work discussed herein is reduced. If t is kept relatively small, then an attacker can still extract little information on the secret server private key to perform a real attack. A practical way of doing this is to use a QR KEM of a higher security level (e.g., security level 5=256 bits) to achieve a lower security level (e.g., security level 1=128 bits). By using this higher security level, the value of t can be increased allowing an attacker to potentially extract more data, but not enough to go under the target (lower) security level. The impact of this approach is that the CPU and bandwidth resources for obtaining the shared key is increased (since a QR KEM with a higher security level is used), but in exchange the effort for the middlebox goes down.

Figure 4:
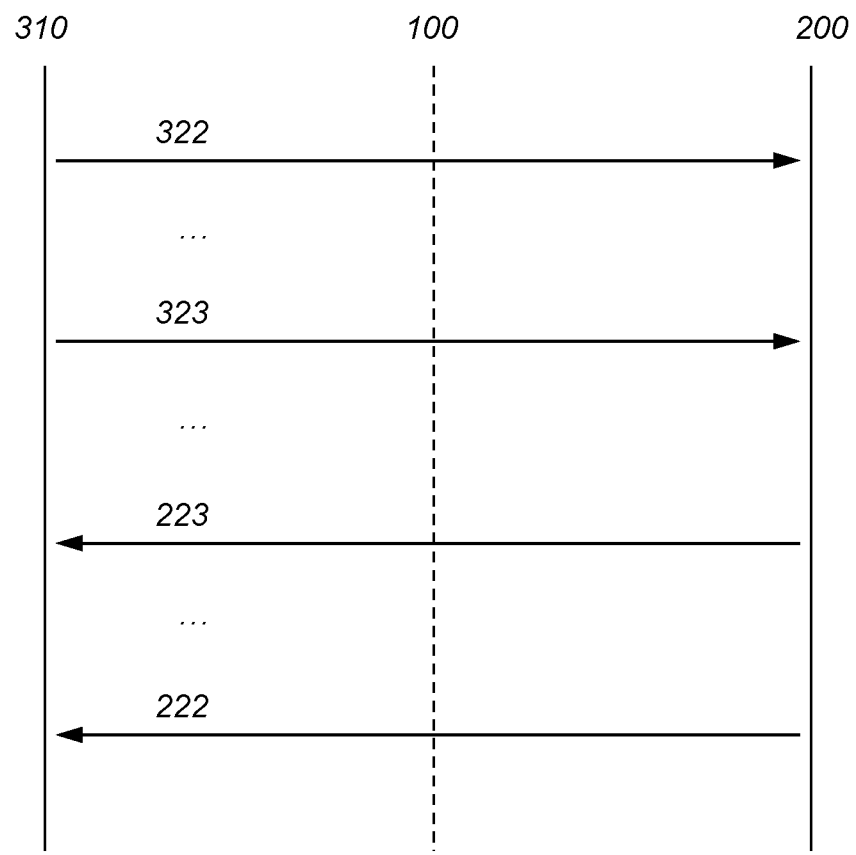

FIG. 4 schematically shows an example of communication in an embodiment of a communication system, such as communication system 500 of FIG. 3. Multiple initiator messages are sent from clients 310, and multiple responder messages are sent from server 200 back to the clients 310. Shown are initiator messages 322 and 323 and responder messages 222 and 223. Unfortunately, the order in which the middlebox 100 gains access to these messages may be different from the order in which the server private keys are listed or generated. As shown in FIG. 4, the responder messages in this example are received out of order. With more than 2 messages the problems multiply. In between the initiator messages and responder messages many other messages may be sent. Furthermore, some messages may be dropped altogether.

This is problematic for the middlebox. For example, a shared key may be determined if the middlebox has the public key from a client, as given in the initiator message and the server private key that was used for the corresponding responder message. However, in a practical setting these may be hard to match up to each other. The middlebox can be configured to match a client public key to the server private key in different ways, a number of which are discussed herein.

Returning to FIG. 3. Middlebox 100 may comprise a server private key storage 432. Server private key storage 432 is configured for storing data items indicating multiple short-term server private keys of the server.

For example, these data items may be obtained from server 200 or from a source common to middlebox 100 and server 200. An out-of-band communication means may be used so that middlebox 100 has access to the server private keys.

One may even arrange server 200 to receive its server private keys from middlebox 100. For example, server 200 may be configured to provide services to multiple sets of clients, e.g., a set of clients may belong to the same organization, e.g., company, etc. A middlebox may be assigned to one of the sets of clients; for example, one middlebox for each set of clients. The server may receive server private keys to use for a particular set of clients from the corresponding middlebox. For example, server 200 may be a cloud e-mail service, which may be used by employees of a company. In this way, the advantages of using a cloud based service are retained, and costs for it are shared among multiple organizations, however each organization retains the possibility to monitor network traffic as desired.

Whether or not multiple middleboxes are used for a single server, or who provisions keys, Middlebox 100 and server 200 may be provided with the same server private keys so that middlebox 100 determine the same shared keys as the clients will share with server 200. In this way, middlebox 100 can analyze the emails, e.g., log them for auditing purposes, etc. In this way the advantages of a cloud-based e-mail service are combined with the advantages of a middlebox.

In an embodiment, storage 432 may comprise a list of the short-term server private keys; for example, said data items may be the server private keys themselves. One other way to share server private keys is to generate the server private keys from a seed. For example, storage 432 may store the seed as a data item. Even if a seed is used, middlebox 100 may be configured to generate server private keys in advance, e.g., to precompute them.

For example, a secret key R of the server may be generated from a random seed seed_r. One could do the same for client private keys, e.g., generate a client private key S form a random seed seed_s; this is not necessary though. Seeds may be sampled from a true random number generator (TRNG). For example, the server or middlebox can generate a seed_r that can be reused to derive multiple secret keys R_i for multiple protocol exchanges. In this approach, the server 200 shares this long-term seed with the middlebox 100, or vice versa. The long-term seed may be used to derive multiple secret keys R_i.

Using a seed reduces the latency between generating the server private key, e.g., at the server, and communicating it to the middlebox 100. A problem with using ephemeral keys, e.g., randomly generated by the server, is that they need to arrive at the middlebox 100 before the middlebox needs access to them, e.g., before matching is performed. As a fresh server private key might be communicated over the same or same type of computer network as the responder message, there is a good chance that the latter might arrive before the former, and thus that the middlebox does not have access to the key that is needed, so that a matching operation would be performed in vain. However, by generating multiple keys from the same seed, the seed can be communicated in advance of needing the key. At the middlebox the server private keys may be precomputed if needed.

For example, generating a key from a seed may use a key derivation function, e.g., hashing the seed together with some additional information, e.g., a counter. For example, in an embodiment, the key derivation function is applied to the seed together with a timestamp that indicates the approximate time period in which the key will be used. For example, the timestamp may be a date+clock time. For example, the additional information may comprise the number of minutes or seconds since 0:00 on 1 Jan. 2020, or the like. The short-term key may then be used in or around the corresponding minute or second, etc. The additional information may comprise, e.g., an identifier of the server. The counter may be the number of keys generated with that seed. Interestingly, even if a seed is used, the resulting keys are different short-term keys, e.g., ephemeral. For an observer of the communication without access to the seed it may not be apparent that a seed is used. Another side effect of using a key is that it may reduce storage space size needed for a server private key storage, especially for keys that are not needed soon.

Even if a seed is used, the issue related to out-of-order reception of responder messages remains. Correlating initiator and responder messages is still needed. For example, network delay may cause the change in order. Another cause is that a server might reply to the incoming client requests in a slightly different order, e.g., if the server uses a queue of jobs and workers to handle the initiator messages. Nevertheless, the middlebox can determine a list of possible server private keys. For example, server private keys may be included that are associated with a timestamp that is close to current time or close to a timestamp of received network package. For example, server private keys may be included that are associated with a serial number that has not been seen by the middlebox before, and for which close serial numbers have recently been processed by it, e.g., unused server private keys with a serial number within a threshold of the highest serial number that has been observed by the middlebox.

For example, given a seed_r, secret keys R_i can be obtained by using the same deterministic random number generator (DRBG) on seed_r. For instance, after initializing the DRBG with seed_r, the first N_0 calls to the DRBG are used to sample R_0, the following N_1 calls to the DRBG are used to sample R_1, . . . etc. A specific instantiation may use an eXtensible Output Function as defined in FIPS202. The initialization may be done by means of the absorb function (SHAKE_Absorb) and the generation of pseudorandom data used to sample the secret is done by means of the squeeze function (SHAKE_Absorb). Another option is to use a function providing domain separation. For instance, one can use Tuple_Hash defined in NIST SP 800-185. A domain separator is in this case can be a counter that identifies how many secret keys have been generated.

Middlebox 100 may comprise an access unit 410. Access unit 410 is configured to access the messages communicated between clients 310 and server 200. For example, access unit 410 may be configured to recognize a message as an initiator message coming from a client, as a responder message coming from the server, or as encrypted communication encrypted with a shared key, or as yet further types of messages. For example, in case of an initiator message, access unit 410 may be configured to store client data 411 in a client data storage 412. For example, the client data 411 may be the initiator message itself or the information therein used to derive the shared key. For example, in an embodiment, client data 411 comprises the client's public key. Note, that access unit 410 need not necessarily do a full parsing, parsing into the categories: initiator messages, responder messages and other is sufficient. Further parsing, if needed, may be left to an analyzer unit. The latter may have the benefit of access to the shared keys.

For example, in an embodiment, client data 411 comprises a computer network address, a client public key and data indicating other cryptographic information of the key exchange protocol, e.g., a public object. For example, in an embodiment, the computer network address may be an IP-address. The client public key may be matrix or polynomial B, e.g., for a lattice based key encapsulation method. The data indicating other cryptographic information of the key exchange protocol may be a seed σ to generate a public object A that maps private keys to public keys in a lattice-based protocol. Storing the computer network address is convenient for some applications, but not necessary.

The middlebox may be configured to pass messages on to the client from the server or from the client to the server. The middlebox may be configured to modify messages before they are passed on. For example, a message from the server to the client may be adapted to indicate to the client that the information was logged by a middlebox, so that the client knows that the middlebox has access to his communication. The middlebox may also remove additional data such as helper data, as is further discussed herein. The middlebox may be configured with passive access only, e.g., the middlebox may receive a copy of the messages passed between clients and server without having to pass them on.

For example, consider a key encapsulation protocol is used in which an encapsulation key is computed from a public and a private key. The middlebox may obtain the same encapsulation key by combining a client public key obtained from an initiator message and stored in client storage 412, and a server private key, e.g., stored in storage 432. The middlebox may be configured to determine the encapsulation key from a stored client public key (Bj) and a server private key (Ri) to decapsulate the encapsulation data (V) recovered from a responder message. The shared key may be derived therefrom. The shared key may be used to decrypt further communication 121 that may be exchanged between client and server.

To find which initiator message corresponds to which server private key, middlebox 400 may comprise a matcher 430. Matcher 430 may be configured to decapsulate the encapsulation data (V) in a responder message using a stored client public key (Bj) and a server private key (Ri) from the key storage 432, obtaining a shared key (K).

In an embodiment, the middlebox may observe an initiator message incoming from the client and store the client computer network address, e.g., IP address, and the client public key, e.g., the public parameter B. The middlebox observes responder messages from the server towards a client with an IP address including ciphertext U,V. The middlebox may determine which client public key to use for that server answer based on the destination IP address in the responder message. The key encapsulation key may be computed from the client public key and the server private key, this in turn may decapsulate the encapsulated data in the responder message, from which the shared key may be derived. For example, the middlebox may computer k=B*R^T where R is the private key of the server. Decapsulation may comprise subtracting the decapsulation key, and extract the secret key from the result, e.g., from V−k.

Using an identifying field in the messages, e.g., using computer network addresses, e.g., the source and destination IP addresses, to find the correct public client key for a responder message is an attractive option to reduce matching overhead. Note though that current network protocols, such as ETS and ENS do not do this, the middlebox in such protocols can directly figure out the shared secret between a client and server when the middlebox observes the incoming message from the client.

Computer network addresses are an option, but not necessary. For example, in an embodiment, the initiator message comprises an identifier identifying the client or session, and the responder message comprises the identifier. For example, the identifier may be a socket, e.g., a network socket. The middlebox may be configured to store the client public key (B) together with the identifier, and possibly other information such as the public object, if one is used. For example, in storage 412. When a responder message is received at the middlebox, the identifier may be obtained from the responder message and the client public key may be retrieved, e.g., from storage 412 using the identifier. The identifier may a nonce, a universally unique identifier (UUID) in addition to a computer address, etc.

Using identifiers such as computer network addresses works very well in some situations. For example, when it is known that clients are arranged to set-up only single communication session with a server, then one can rely on the identifier to fully identify the client public key, thus solving this part of the matching. In less predictable networks, more care may be needed.

At the middlebox there may be uncertainty regarding the exact server private key that was used, e.g., because the server is not predictable enough to use the keys in a particular order. There may also be uncertainty about the public key. The latter may in part be addressed by tracking additional information such as computer network addresses, but these methods may not be foolproof either. For example, a client may start multiple connections so that there are potential client public keys. Even if it were perfectly known which client public key to use, the uncertainty about the server private key remains.

There are various ways in which the middlebox may know which key should be used with which packets, e.g., which client private key with which server private key. In particular, the middlebox may observe a number of incoming initiator messages containing (sigma_j, B_j). The middlebox may also have access to a number of secret keys R_i. Initially, the middlebox may not know which secret key R_i should be used with which B_j. Even if the middlebox knows that the server selected its key from a list of potential short-term keys, the middlebox may not know which key exactly. For example, based on a time window or on the keys that have already been used, the middlebox can narrow the number of server private keys down, albeit not always down to 1.

For example, the middlebox might have seen 5 incoming messages including 5 B_i and it might have 5 potential secret key candidates R_i used to decapsulate k out of messages (U,V). Here, it is assumed that a new R_i is used for each message, e.g., the keys are ephemeral. There are several options to solve this issue.

For example, the middlebox may try multiple stored client public key (Bj) obtained from multiple initiator messages and/or multiple server private keys (Ri) obtaining multiple possible decapsulations of the encapsulation data. Which one of the possible decapsulations of the encapsulation data is the correct one, may be done by verifying.

For example, from a possible decapsulation of the encapsulated data a possible shared key may be derived. A possible share key may be verified by attempting to use it in the later communication that may be encrypted with the possible shared key, e.g., when decrypting a later further communication. For example, in an embodiment, a middlebox may be configured to decrypt and/or authenticate a further communication using a possible shared key. If the decryption and/or authentication verification matches an expectation of the decryption and/or authentication check, the key is accepted as correct. For example, the further communication may comprise a predetermined string, a nonce, a checksum or the like, which may be used to verify the key. Such information may also be in the responder message, e.g., in the form of help data, also discussed herein. For example, the responder message may comprise a nonce and an encryption of the nonce using the shared key which may be used to verify if the shared key is correct. Instead of a nonce, a fixed string may be used. Using a fixed string for the shared key does not leak much information for an attacker as the algorithm that may be used to encrypt it, may be a conventional symmetric algorithm, e.g., AES. For example, the possible shared key may have been used by the client or server to create an authentication tag, e.g., over part of the further communication, e.g., the authentication tag may be included in the further communication. If the possible shared key is correct, the authentication tag will be verified correctly.

In an embodiment, possible shared keys are stored associated with the IP address of the client. When further communication arrives, it may be checked against the stored possible keys. Shared keys that are incorrect may be discarded. An advantage of this approach is that it has low impact on the modifications that might be made in the protocol.

In an embodiment, the middle box is configured to obtain a possible encapsulation key from a server private key, e.g., server private key number i, e.g., key Ri, selected from a list of possible keys R1, R2, R3, . . . and/or a stored client public key, e.g., client public key number j, e.g., key Bj, selected from a list of possible keys, B1, B2, B3, . . . As with the shared key, the middlebox may try multiple combinations to find multiple possible encapsulation keys. There are various ways to verify which encapsulation key is the correct one. One option is for the server to add helper data, similar as for the shared key, e.g., an encryption of a nonce or known string. Another option is to observe the decapsulation algorithm. A decapsulation algorithm allows one to obtain the correct key material, even if the decapsulation key is not entirely the same as the key used for encapsulation. In an embodiment, the decapsulation algorithm is configured to provide a distance measure that indicates how distant the encapsulation key derived for decapsulation differs from the encapsulation key used by the server for encapsulation. The distance measure may indicate how much correction took place. For example, the distance measure may comprise a number of corrected errors (if an error-correcting code is used), and/or an amount of rounding. For example, in an embodiment, after decapsulation, one can compute back from the decapsulated key material what the encapsulation key was at the server side. The distance may be a distance, say a Euclidian distance, hamming distance, etc., between client side encapsulation key and server side encapsulation key. For example, the distance may be the distance between K' and Kq/2, e.g., as in the example on pages 8-9. A hamming distance may be computed between before and after error correction on K'.

Normally, the distance measure is low, indicating that both encapsulation keys are close to each other. The latter is the expected situation. Although the two keys will usually differ due to noise used in the algorithm, the keys will still be close to each other to ensure that almost always the protocol will give a correct shared key. In an embodiment, the middle box may reject possible encapsulation keys that give rise to a high distance measure, e.g., above a threshold. The threshold may be computed mathematically but may also be established empirically. In an embodiment, the middle box may select the possible encapsulation keys that give the lowest distance measure. Features to verify a shared key may be combined with features verifying an encapsulation key. If an encapsulation key is rejected so will the corresponding shared key be, and vice versa. For example, the middlebox may select the best encapsulation keys, e.g., with the lowest distance measure, e.g., the n lowest, or all keys below a threshold, etc., and further select on criteria for a shared key.

There are various ways to create a distance measure for encapsulation keys. In an embodiment, the decapsulation comprises a rounding step. For example, during encapsulation, bits may be mapped to fixed values, say to 0 and $$\frac{q}{2}$$

for some q, e.g., a modulus q. During decapsulation, values may be rounded back to the closest fixed values. Although it is expected that the values obtained before rounding will not exactly be the fixed values, in practice they are close to them. The distance measure may be the total amount of rounding, e.g., when working modulo q one may sum the values $\min(|x-f|, q-|x-f|)$, wherein || denotes absolute value, and wherein x is the value before rounding, and f is the fixed value after rounding. Such formulas can be varied, e.g., instead of absolute values, one may take squares, e.g., summing $\min(|x-f|, q-|x-f|)^2$, and so on.

For example, in an embodiment the amount of rounding in the decapsulation may summed, and/or the number of corrected errors in the decapsulation may be counted. If the former and/or the latter is above a corresponding threshold then the shared key may be discarded as incorrect. The two values could be combined into a single value, e.g., as the sum or some other linear combination, etc., and compared to a threshold. |

Another way to create a distance measure for encapsulation keys, which may be combined with the above measure, applies if the decapsulation employs an error correction algorithm of an error correcting code (ECC). For example, in an embodiment, the decapsulation algorithm comprises the application of an error correction algorithm. This is not necessary but may be used to reduce errors. For example, the server may add redundancy data, e.g., parity bits, e.g., a difference with a code word, and so on. During decapsulation the redundancy data may be used to remove noise. The amount of noise removed may be used as a distance measure. For example, one may count the number of corrected bits, known as a hard error count. For example, one may compute the distance between corrected bits and soft information regarding the bit, e.g., as derived from an initial distance to fixed values as discussed above, e.g., known as a soft error count.

Informally, one observes the decapsulation for how bad or how well, the decapsulation proceeds. If it proceeds badly, this may be due to an especially unlucky draw of the noise, but more likely is due to the server private key (or client public key) being used. For example, observing the amount of correction that is needed, e.g., using soft-errors can be applied even if there is no explicit error correction algorithm. For example, one may count how many components are far away from decision points, e.g., fixed values 0 and q/2. For example, this may be applied to protocols such as SABER or Frodo.

An example of a lattice-based KEMs using error correction is Round5. The extra information exchanged as part of the error correction code can be used by the middlebox to correlate which key should be used with which packets without requiring the exchange of any additional information. The reason for this is that the key decryption step in Round5 first computes a message $M\_ij=V-X\_ij$ where V contains the key encapsulated by the server, $X\_ij=B\_j R\_i\char`\^t$ where B_j are public-keys received before and R_i are potential private keys. In Round5, M_ij is the message before applying error correction and this message mu=kappa+xe_bits bits long, where kappa is the length of the key (128, 192, 256 bits long) and xe_bits is the length of the parity bits used to correct potential errors. If no error occurs, the last xe_bits bits of M_ij are zero so that no modifications are introduced in the first kappa bits during error correction. Since the middlebox will be trying out the above process with different combinations of B_j and R_i, it is expected that if the middlebox uses the wrong combination, then errors will be made and the hamming weight of the last xe_bits of M_ij will be greater than 0. Based on this, the middlebox, when using Round5, will be choosing the secret key R_i that minimizes the hamming weight of the last xe_bits of M_ij. More generally, we can look at the total number of positions changed by xef-decoding. An alternative applicable to schemes without error correction is to look at "soft decision" information, i.e., how close the components of X_{i,j} are to 0 or q/2.

Finding the shared key in the middlebox can be assisted by the server by including helper data. Note that helper data is not necessary, as the middlebox can find the correct key without this helper data. In an embodiment, the server computes and adds helper data to the responder message. A disadvantage of this approach is that it increases the impact on existing infrastructure: Servers need to compute this information and fit it in the responder message; clients need to ignore the helper data, or, if the middlebox is of the forwarding type, it may remove the helper data. It is generally seen as desirable to have a small impact on existing infrastructure. On the other hand, helper data has tangible advantages, as discussed herein.

In an embodiment, server 200 is configured to compute first helper data to identify the server private key and/or the client public key. For example, the first helper data may comprise a digest of the server private key, and/or a digest of the client public key. For example, when determining the responder message the server may compute the digest of the server private key and/or the digest of the client public key that is used for that responder message. A digest may be computed with a hash function, say, SHA-3 or the like. Instead of a digest, a computation with the key may be included, e.g., on a nonce.

For example, the middlebox may select a server private key that has the same digest as the digest reported in the helper data. An advantage is that the middlebox is virtually sure the correct server private key will be used.

For example, the middlebox may select a client public key that has the same digest as the digest reported in the helper data. An advantage is that the middlebox is virtually sure the correct client public key will be used.

If no key is found with the correct digest, this means that either the middlebox misses a message or that the message has not yet arrived. For example, a middlebox may not yet have received a new batch of server private keys, e.g., as a list or as a seed. In such a case, an error signal may be generated.

The middlebox may remove first helper data before passing on the responder message; this is not necessary; the helper data may be in a field that the client is not required to parse and can ignore.

The middlebox may precompute the digests. For example, the middlebox may precompute server private keys from a seed, and the corresponding digests.

In an embodiment, first helper data is included by the server, e.g., the hash of the secret key $R\_i$, i.e., $H\_i$=hash$(R\_i)$ used to encapsulate key material m. The server may send $(U,V, H\_i)$. When processing this message, the middlebox, which has access to the hashes $H'\_i$ of the secret keys that might have been used to encapsulate the message, selects the secret key $R'\_i$ for which $H'\_i$=$H\_i$. In this case, the middlebox may for example keep two lists with:

List 1: (IP_source_j, B_j). Items are added to List 1 every time a new handshake is received from the client. The IP_source refers to the IP address of the client.

List 2: $R\_i$, $H\_i$=hash$(R\_i)$. Items are added to List 2 every time a new handshake is received by taking the seed_R and using it further to derive a new secret $R\_i$ Given these two lists, when receiving a message from the server including $(U\_j, V\_j, H\_i)$, the middlebox may check which secret key $R\_i$ should be used by checking which $H\_i$ fits $H'\_i$. Furthermore, the middlebox may check the IP destination in the responder message received from the server and select an entry in List 1 with the same (source) IP address. The server could also include $B\_j$, e.g., the hash of $B\_j$, as explicit helper data. When found, the middlebox selects the corresponding $B\_j$. With the chosen $R\_i$ and $B\_j$, the middlebox can decapsulate the secret encapsulated in $V\_j$.

Instead or in addition to assisting the identification of the server private key and/or client public key, with first helper data, the server may provide second helper data in the responder message to assist in verifying the shared key, and in that way assist in finding the right match. Examples of such second helper data are described herein. For example, the second helper data may comprise an authentication tag computed with the shared key; for example: an encryption or message authentication code (mac) over known data. The known data may be part of the responder message, e.g., a nonce added for that purpose. The second helper data may comprise an encryption of the shared key, or encapsulation key.

For example, one option is to include a nonce and a message authentication code of the nonce using the encapsulated key material, shared key, or encapsulation key. The middlebox can then try out the potential decapsulated keys $k\_{ij}$ to verify the message authentication code, identifying the encapsulated key used between client and server. In an embodiment, the nonce may be sent to the middlebox in advance. The message authentication code only needs to be sent from the server to the middlebox. The middlebox does not need to forward this information to the client.

For example, in an embodiment, a server private key number i may be computed by server and middlebox as $f(i,$ key_seed$)$. A nonce used for second helper data may be computed as $g(i,$ nonce_seed$)$. The functions f and g may be key derivation functions; the functions may be the same or the seeds may be the same. An advantage of this approach is that the nonce does not need to be included in the responder message.

In an embodiment, a server private key number i may be computed by server and middlebox as $f(i,$ key_seed$)$ or as $f($salt, key_seed$)$. The salt or number i may be included in the responder message. The number i may be included in the responder message only as a digest. For example, one may have R=Hash(Seed|salt), with the salt included in the responder message.

It is possible, but not necessary to define a protocol extension, e.g., in TLS1.3, as a so-called TLS extension, see, e.g., RFC 8447. The extension may be configured to include the helper data (of any kind, e.g., of any kind as described herein). The middlebox may be configured to process the extension. The client receiving the message does not need to be able to process the extension field, and may ignore the extension.

A problem with helper data is that it may not conform to current infrastructure. Although this may be resolved, e.g., by extensions, the resulting protocol differs from messages described in the standard; this is not necessarily problematic, but for some applications it may be preferable to avoid modifications. One way to avoid this is to use a KEM that already includes helper data that can be used by the middlebox to identify the right key; for example, by using estimated public keys, error correction, decapsulation performance and the like.

For example, the responder message may comprise the server public key and encapsulation data. The client would use its own client private key and combine it with the server public key to derive the encapsulation key. However, the middlebox may combine the client public key with the server private key. Yet a further way to speed up the identification of the correct server private key is to use a server public key included in the responder message. Typically, in an asymmetric scheme a public key can be computed from the private key. The middlebox has access to the short-term server private keys and thus can compute corresponding public keys. The public key computed by the middlebox may be identical to the public key of the server, or the public key computed by the middlebox may be close to it—this depends, e.g., whether noise is applied, and whether the noise is deterministic or not. For example, in an embodiment, the middlebox is configured with access to the server public keys, e.g., provided to it in a list or computed, possibly pre-computed, from server private keys. When a responder message needs to be matched, the public key in the responder message is compared to the public keys at the middlebox. When a match is found, the corresponding server private key is the server private key used for the responder message.

For example, continuing from an example above, the middlebox may use sigma and U to perform the mapping. Given the sigma value in the initiator message (client to server), the middlebox obtains public object A, e.g., following the KEM protocol, and may derive an estimation U' as it should be at the server. The estimation of U' may be computed as a noisy computation, e.g., $A*R^T$, or as a non-noisy computation, e.g., $AR^T$. When the middlebox receives responder messages from the server, it can check that a received U in a responder message is close to U', e.g., component wise. For example, in the case of LWR, the components of U and U' are be equal. In the case of LWE, the components of U and U' are equal except by a small error E. It is not required for the middlebox to compute all the components of U', but a subset of them is enough to determine with very high probability whether a mapping is correct.

For example, in an embodiment, sigma and U are used to match the incoming message. For example, the middlebox may have several incoming messages mj=(sigma_j, B_j) and several possible server private keys R_i. The middlebox may compute multiple possible server public keys U'_ij = A_j*R_i^T, where A_j is computed using sigma_j. Given U'_ij, the middlebox can match the answer (U,V) from the server by checking whether U and U_ij=A_j*Ri^T, e.g., for one of the possible R_i that the middlebox has access to, and verify if they are sufficiently similar. If so, then the encapsulated key is K=v−B_j*R_i^T. If not, then the middlebox may try with another secret key R_i and another A_j. To reduce computational overhead, the middlebox may compute an A_j and try multiple, e.g., all choices of R_i before trying another message. Computing a public key from private key is an efficient operation, especially in lattice based systems, so this operation does not provide much overhead, and does not require protocol modifications.

In an embodiment, the estimated public key is computed from the private key with a non-noisy operation, e.g., a non-noisy multiplication. As the public key will only be used for matching, e.g., for finding the server private key corresponding to a responder message, and will not be used in actual cryptographic operations, the usual precaution of using a noisy operation, e.g., noisy multiplication, is not needed. This has the advantage that only noise from one side is present and thus the two version of the public key (U and U') are expected to be closer to each other, thus facilitating the selection.

In an embodiment, the initiator message comprises a public object seed (σ) for generating a public object (A), e.g., a matrix or a polynomial, a public key (B; U) being related to a private key (S; R) with a noisy multiplication with the public object. Noisy multiplication may comprise adding explicit noise to the multiplication result, or rounding/scaling the multiplication result. The middlebox may be configured to derive the public object for an initiator message, e.g., from the public object seed, and compute at least an approximate public key for one or more private keys from the key storage. If noise is deterministic, e.g., for rounding, the estimation may be exact, if noise is not deterministic than an approximation may be computed.

This approach works for lattice based KEM protocols, but also applies to a Diffie-Hellman key exchange (KEX). For instance, Round5, SABER or Kyber can be defined as a KEX as well. In this case, the ETS and ENS protocols can remain as they are, as the middlebox can determine a key between a client and the server from the public key of the client and the secret key of the server Yet a further option is to distribute to the middlebox the key materials, e.g., shared keys, that are encapsulated by the server. This can be done without protocol modifications, since the encapsulated key material is typically generated at random. The keys could accordingly be generated in advanced and pre-distributed to the middlebox in a list. As an alternative, server and middlebox could generate those keys from a seed.

FIG. 3 shows a server private key 431 retrieved from a server private key storage 432 by matcher 430. Matcher 430 may combine the server private key 431 with a client public key from an initiator message to obtain a key encapsulation key. The latter may be used to decapsulate the encapsulated data. For example, the latter may recover key material. The key material may comprise, or be equal to, the shared key, but may also be used as an input to a key derivation function. For example, shared key K may be K=H (m). Matcher 430 may be configured to verify the shared key, e.g., by verifying the encapsulation key, by verifying the decapsulation process, possibly using helper data, etc., as described herein. The matcher 430 may have to try multiple server private keys and/or multiple client public keys to do so.

When matcher 430 has found the shared key, it may be stored in a shared key storage 433, e.g., associated with the computer network address of the client, and/or associated with a stream identifier that identifies the communication encrypted with this particular shared key. For example, a stream identifier may be included in the initiator and/or responder and/or a combination thereof.

Middlebox 100 may comprise a decryptor 440. For example, when access unit 410 identifies a further encrypted communication 121 between client and server, the further communication 121 may be decrypted by decryptor 440 using the shared key stored in shared key storage 433. The decrypted further communication may be forwarded to an analyzer 450. Analyzer 450 may be used for a variety of purposes, depending on the purpose of the middlebox. For example, analyzer 450 may be used for security purposes, e.g., detect attacks, leaks, viruses, etc. For example, analyzer 450 may be used for network purposes, e.g., load balancing, pre-fetching, etc. Many other functions can be accommodated with access to the decrypted communication of the clients.

As noted, a static key can have particular severe consequence for a lattice-based algorithm, but also for non-lattice-based algorithms it may be desired to avoid long-term keys. For example, fault attacks often require repeated attempts to derive actionable information. Embodiments may be used to change the server private key, even if, say, a key may be used longer than a lattice-based key might be.

For example, server private key keys may be derived from an initial seed seed_r for other protocols, say, ECDH. In this case, the server and the middlebox may share a secret seed used to derive the server's secret keys R_i. Given a secret key R_i, the middlebox can also compute the public parameter as R_i*G. The middlebox may map responder messages to multiple possible secret keys R_i.

Regardless of the type of key, to improve forward security, the seed_r may be changed from time to time.

In an embodiment, a client obtains multiple key shares corresponding to multiple cryptographic algorithms (e.g., ECDH, SABER, etc.) and the server encapsulates multiple keys, one per algorithm. The final key may be derived by the client as a combination (e.g., key derivation function) of the exchanged keys with each of the cryptographic algorithms. In this way, even if one of the algorithms (e.g., ECDH, Frodo) turns out to be unsecure, the final key is still secure. The middlebox may do the same thing, e.g., obtain multiple shared keys for multiple algorithms and combine them. In this case, the middlebox search may use the cryptographic algorithm with best performance. This reduces the search time since the result—e.g., the specific combination of public-key and private-key, etc., as described above—is applicable to the multiple algorithms In an embodiment, server 200 may be configured to execute a key encapsulation protocol with the one or more clients to obtain a shared key with one or more clients and to exchange further communication with the client encrypted with the shared key. For example, one key encapsulation protocol may comprise receiving an initiator messages of the KEM protocol from a client, an initiator message comprising a client public key (B), obtaining a current short-term private key, generating a responder message according to the KEM protocol in response to the received initiator message. Moreover, the server may include in the responder message helper data to assist the middlebox in obtaining the shared key. For example, the helper data may comprise first helper data to identify the server private key and/or the client public key, and/or second helper data to verify that the shared key is correct.

Note that, the server may be configured to accommodate any of the options described for the middlebox.

Decapsulation may provide the shared key directly or key material from which the shared key is derived. For example, to derive a final key one may take into account some parameters that are determined by client and server such as the ciphertext. For instance, Round5 derives the final key in its CPA-secure KEM (see Alg 5 in Round5) as the hash function of a randomly sampled secret m concatenated with the ciphertext. The ciphertext in the CPA-secure KEM includes U (which in this example is equivalent to $A*R^T$) and V (which includes the encapsulated value). Thus, one could predistribute a long list of random values m to the middlebox, but U and V depend on information determined by the client (e.g., A). In the case of CCA-KEMs, this dependency is even stronger since the encapsulated key is not generated randomly, but it also depends on the actual public-key (e.g., sigma and B) (see Alg8 at Round5).

If the middlebox has a list of secrets, e.g., of the key material (or a seed to generate them) then it may follow the specific key derivation step in the QR-KEM. For instance, in the case of Round5 CPA secure KEM the middlebox has to compute the final key as Hash(k, ct) where ct=(U,V). A challenge remains to correlate k and ct, i.e., using the right ct_j with the right k_i. To solve this, the server can send along ct_j and helper data about k_j, e.g., its hash, so that the middlebox can determine which key it should use in the key derivation step. This helper data can be included in an extension.

In a further variant, the middlebox and server may share a symmetric-key sk. This symmetric-key may be used by the server to encrypt the final shared key k in the QR-KEM a second time by means of a symmetric-key encryption, e.g., AES, e.g., in GCM mode. This key can be obtained by running a standard protocol such as TLS 1.3. GCM mode uses a nonce, but this could be derived, say, from a hash of the ciphertext, e.g., as the hash of U,V. Thus, the information sent from the middlebox to the server may comprise ((U,V), AESGCM(Hash(U,V), k, sk)). When the middlebox receives this message, it can decrypt k. An advantage of this approach is that the middlebox does not require correlating any information. Instead, the middlebox can directly extract the key.

In a further variant, the middlebox has a public-private key pair and server has the middlebox's public-key. The middlebox public-key may be used by the server to encrypt/encapsulate the final shared key k in the QR-KEM a second time. The encryption/encapsulation of key k with the public-key of the server generates the ciphertext (U_MS, V_MS). This second encryption can be sent in a protocol extension. The information sent from the server towards the client over the middlebox may include: (U_CS,V_CS) (U_MS,V_MS). The first pair may be the regular encrypted message towards the client; the second pair may be the encrypted message sent towards the middlebox embedded in a protocol extension. When the middlebox receives this message, it can decrypt k using its private key following a standard decryption algorithm, e.g., of Saber, Kyber, Round5, etc. An advantage of this approach is that the middlebox does not require correlating any information. Instead, the middlebox can directly extract the key.

Below an example embodiment is given in which some choices have been made for the various options. The embodiment is included to assist in understanding of the technology, and is not intended to limit to the choices suggested below.

1. Multiple clients: Obtain long-term client public seed σ, client public object A=f(σ), long-term client private key S, client public key B, with a noisy multiplication, B=S*A, e.g., B=SA+noise. The noise can be explicit, e.g., adding a noise term, or may be implicit, e.g., by rounding or scaling the result.

2. Multiple clients: Send an initiator message of a QR KEM-protocol to a server. The initiator message comprises the client public seed σ and client public key B that are specific for the client that sends the initiator message.

3. Server: The server receives multiple initiator messages from multiple clients. For each client and each initiator message, the server generates an ephemeral server private key R and a server public key U. The server public key may be computed with a noisy multiplication $U=A*R^T$, e.g., $U=AR^T$+noise. Like in the private public key, the noise can be explicitly added, or may be implicit, e.g., by rounding or scaling the result. Server also generates key material m, encapsulation key $k=BR^T$ and encapsulation data V. The encapsulation data encapsulates the key material with the encapsulation key. Server sends a responder message comprising the server public key U and encapsulation data V to the client. Server computes a shared key K from the public key U and the encapsulation data, e.g., key material m that is in it.

4. Middlebox: has access to the initiator message and responder messages. Middlebox stores a seed or list of private keys R used by the server or a seed from which they can be generated. Middlebox knows only approximately which responder message was created with which private key R.

5. Middlebox: finds a match between a client public key Bj and a server private key Ri so that the shared key for the client can be obtained. Finding a match may be done as in steps 6-8 below 6. Middlebox: when an initiator message is received the IP address and public key is stored on a first list. (IP, Bj).

7. Middlebox: when a responder message is received a private key identifier is obtained from it (e.g., hash of Ri). The server private key Ri is received from storage as identified by the private key identifier.

8. Middlebox: the combination $Bj*Ri^T$ provides the encapsulation key to decapsulate V in the responder message. The shared key is obtained.

As noted herein, there are many variants, especially for steps 5-8. The example embodiment uses IP address to identify a client message, which means that if the same IP address is used for multiple initiator messages the right message may be missed. This may be resolved by adding features described herein, e.g., helper data or other ways verify a key.

FIG. 6a schematically shows an example of an embodiment of a middlebox method 600. The middlebox method (600) is configured for processing communication between one or more clients and a server, the one or more clients having a client private key and a corresponding client public key, the server having server private keys and corresponding server public keys, the server private and public key being short-term keys. The middlebox method 600 comprises accessing (610) digital communication on a computer network between the one or more clients and the server, a client and the server being configured to execute a key encapsulation protocol to obtain a shared key and to exchange further communication encrypted with the shared key, storing (620) data items indicating multiple short-term server private keys of the server, receiving (630) one or more initiator messages of the KEM protocol from the one or more clients, the initiator message comprising the client public key (B) of the corresponding client, receiving (640) one or more responder messages of the KEM protocol from the server for the one or more initiator messages, a responder message comprising a server public key (U) and encapsulation data (V), the server public key (U) corresponding to a short-term server private key (R), decapsulating (650) the encapsulation data (V) using a stored client public key (Bj) and a server private key (Ri) from the key storage, obtaining a shared key (K), verifying (660) that the shared key is correct and decrypting the further communication between corresponding client and server.

FIG. 6b schematically shows an example of an embodiment of a server method 700. The server method (700) is configured for communicating with one or more clients, the one or more clients having a client private key and corresponding client public key, the server having server private keys and corresponding server public keys, the server private and public keys being short-term keys. The server method comprises digitally communicating (710) on a computer network with the one or more clients, the digital communication being configured for access by a middlebox, executing (720) a key encapsulation protocol with the one or more clients to obtain a shared key with the one or more clients and to exchange further communication with the client encrypted with the shared key, executing the key encapsulation protocol comprising one or more iterations of:

receiving (730) an initiator messages of the KEM protocol from a client, an initiator message comprising a client public key (B), obtaining (740) a current short-term private key, generating (750) a responder message according to the KEM protocol in response to the received initiator message, a responder message comprising a server public key (U) and encapsulation data (V), the server public key (U) corresponding to the current short-term server private key (R), the responder message further comprising encapsulation data (V) for communicating a shared key, the encapsulation data being encapsulated using the client public key in the initiator message and the current server private key.

The middlebox may be configured to detect attacks on the server by a client. For example, the middlebox may monitor whether a client sends multiple requests with the same public object A. An attacker, posing as a client, may want to do this to learn how often and when the server changes it keys. This information in turn may be used to optimize an attack on the server—initiator messages may be concentrated in a window in which it is suspected that the server uses the same key. The middlebox might reject requests from clients with the same public object A to prevent them from learning this information.

The middle box may detect other attacks as well. For example, the middlebox may monitor the distribution of the noise. For example, this may use the distinguisher described in Section 4.4 of the paper "Lattice Decoding Attacks on Binary LWE" by Shi Bai and Steven D. Galbraith, (included herein by reference). Assume that $v \in Z^m$ is a small vector in a lattice such that $vA \equiv 0 \pmod q$. Then, if v is such a lattice point, then $vb \equiv v(As+e) \equiv ve \pmod q$ will be small if the client is following the protocol specification. If the client is following Attack 1, then the result will not be small. In this attack monitoring technique the middlebox may derive A given the seed, perform a lattice reduction algorithm to find a small lattice point v in the lattice, and then check whether vb is small or not. Since this is a relatively expensive procedure, the middlebox might perform this check only for part of the incoming requests.

Since an attacker may try to attack a server that uses a static key, a client may wish to verify that a server has been configured with short-term keys, e.g., ephemeral keys, or not. For example, a client may check whether the server always uses a static key R, by sending two requests with same the public object A. Upon reception of the two responses, (U1,V1) and (U2,V2), the client checks whether U1 and U2 are equal (e.g., with deterministic noise, e.g., in case of a learning with rounding scheme such as Round5 or SABER) or nearly equal (e.g., with non-deterministic noise, e.g., in case of learning with errors scheme such as LAC, Kyber, etc.). For example, the two initiator messages may be sent in a short time-frame.

The client may additionally or instead check whether protocol requests with a small malformed B are rejected by the server (addresses attack 2).

If the client detects a server using a static key, the client might stop the communication. The client might also show a message to the user indicating about the situation. This message can be an error or an alarm message. This error might be shown in a web browser. The client might also report the buggy server to a computer emergency response team or report the vulnerability.

For example, a client is provided for verifying the configuration of a server, possibly through a middlebox, the server having server private keys and corresponding server public keys, the client being configured to verify whether the server private and public key are short-term keys, the middlebox comprising an interface for digital communication on a computer network with the server, the client and the server being configured to execute a key encapsulation protocol to obtain a shared key, a processor system configured to send multiple initiator messages of the KEM protocol from the client to the server, the initiator message comprising the client public key (B) of the corresponding client, and data indicating a public object (A), e.g., a public object seed, the client public key (B) may correspond to a client private key (S) through a noisy multiplication with the public object but this is not necessary, receive multiple responder messages of the KEM protocol from the server for the multiple initiator messages, a responder message comprising a server public key (U) and encapsulation data (V), the server public key (U) corresponding to a server private key (R), determining if at least two server public keys in the multiple responder messages are equal or close to each other. For example, the client may be configured to generate an error signal, in case of the said determination.

If the server has been verified, the client may execute a further KEM protocol or use one of the multiple KEM protocols to establish a shared key with the server. The shared key may be used as described herein, e.g., to encrypt further communication. This client may be used in an embodiment of a communication system as described herein, but this is not necessary.

The role of the client may instead be played by the middlebox, so that the middlebox can determine that the server uses long-term keys. For example, in an embodiment, a middlebox is arranged as above to determine if at least two server public keys in multiple responder messages are equal, etc. A server may use long-term keys intentionally or due to malfunction, e.g., programming error, misconfiguration, etc. Yet, when a long-term key is used the client's communication may still be compromised. The client and/or middlebox thus have an interested in verifying that the server works correct and uses short-term keys.

Whether two keys are close depends on the particular KEM scheme, and can be established mathematically or empirically, e.g., a distance may be below a threshold for two close keys. Verifying may be done together with processing communication as in an embodiment, e.g., comprising decapsulating data, but this is not necessary as the verifying a server has independent merit.

The skilled person will be able to adapt the above example a key exchange, in particular, a Diffie-Hellman key exchange, both pre-quantum or post-quantum.

FIG. 7a schematically shows an example of an embodiment of a client method (800) for verifying the configuration of a server. The client method comprises digitally communicating (810) on a computer network with the server, the client and the server being configured to execute a key encapsulation protocol to obtain a shared key, sending (820) multiple initiator messages of the KEM protocol from the client to the server, the initiator message comprising the client public key (B) of the corresponding client, and data indicating a public object (A), e.g., a public object seed, the client public key (B) may correspond to a client private key (S) through a noisy multiplication with the public object but this is not necessary, receiving (830) multiple responder messages of the KEM protocol from the server for the multiple initiator messages, a responder message comprising a server public key (U) and encapsulation data (V), the server public key (U) corresponding to a server private key (R), determining (840) if at least two server public keys in the multiple responder messages are equal or close to each other, and, for example, generate an error signal if so.

Client method 800 may also or instead be executed by a middlebox, e.g., replacing client with middlebox. Thus, with or without matching and/or decapsulation as described herein. For example, FIG. 7b schematically shows an example of an embodiment of a middlebox method for verifying the configuration of a server. The embodiment of a middlebox method may comprise or may further comprise:

sending (670) multiple initiator messages of the KEM protocol to the server, the initiator messages comprising the data indicating a public object (A), said indicating data being the same in the multiple initiator messages, receiving (680) multiple responder messages of the KEM protocol from the server for the multiple initiator messages, a responder message comprising a server public key (U) corresponding to a server private key (R), determining (690) if at least two server public keys in the multiple responder messages are equal or close to each other, and, for example, generate an error signal if so.

In the various embodiments of middlebox, server and clients, the communication interface may be selected from various alternatives. For example, the interface may be a network interface to a local or wide area network, e.g., the Internet, etc. The devices may have a user interface, which may include well-known elements such as one or more buttons, a keyboard, display, touch screen, etc. The user interface may be arranged for accommodating user interaction for initiating or verifying a communication. Note that a user interface is not needed for many applications. For example, embedded embodiments may not need a user interface.

Storage may be implemented as an electronic memory, say a flash memory, or magnetic memory, say hard disk or the like, or optical memory, e.g., a DVD. Storage may comprise multiple discrete memories together making up storage 110. Storage may comprise a temporary memory, say a RAM.

Typically, middlebox, server and clients each comprise a microprocessor which executes appropriate software stored at the middlebox, server and client; for example, that software may have been downloaded and/or stored in a corresponding memory, e.g., a volatile memory such as RAM or a non-volatile memory such as Flash. The middlebox, server and client may also be equipped with microprocessors and memories. Alternatively, they may, in whole or in part, be implemented in programmable logic, e.g., as field-programmable gate array (FPGA). They may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform an embodiment of method, e.g., method 600, 700, 800, etc. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 8A:
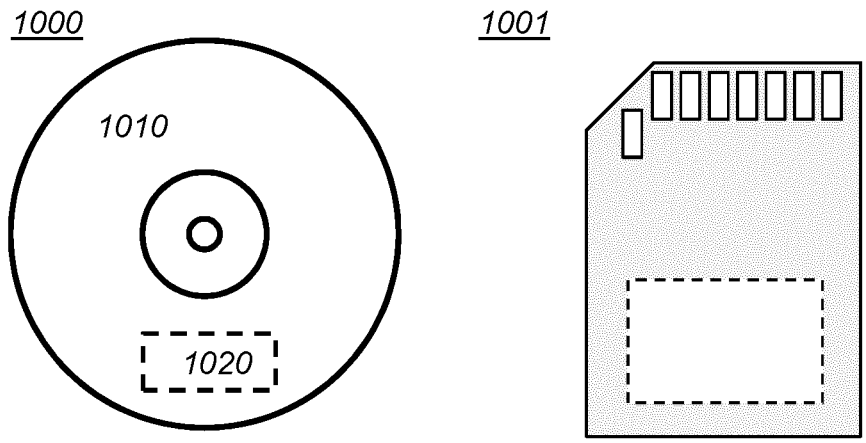

FIG. 8*a* shows a computer readable medium 1000 having a writable part 1010, and a computer readable medium 1001 also having a writable part. Computer readable medium 1000 is shown in the form of an optically readable medium. Computer readable medium 1001 is shown in the form of an electronic memory, in this case a memory card. Computer readable medium 1000 and 1001 may store data 1020 wherein the data may indicate instructions, which when executed by a processor system, cause a processor system to perform a middlebox, server or client method, according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method.

Figure 8B:
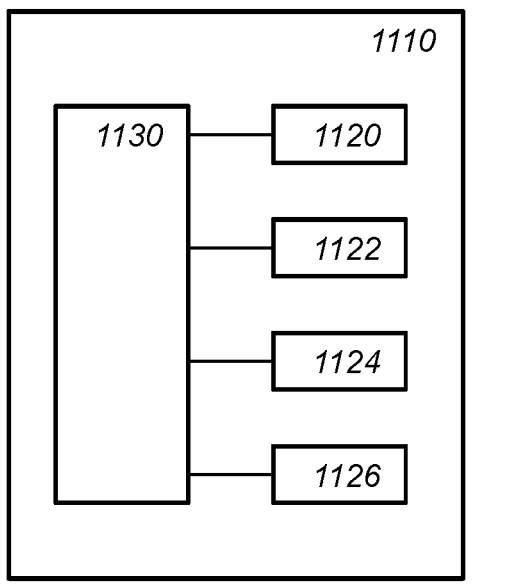

FIG. 8*b* shows in a schematic representation of a processor system 1140 according to an embodiment of a middlebox, server or client. The processor system comprises one or more integrated circuits 1110. The architecture of the one or more integrated circuits 1110 is schematically shown in FIG. 8*b*. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the server, client or middlebox may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

The processor may include multiple microprocessors that are configured to independently execute the methods described herein or are configured to perform steps or subroutines of the methods described herein such that the multiple processors cooperate to achieve the functionality described herein. Further, where the device is implemented in a cloud computing system, the various hardware components may belong to separate physical systems. For example, the processor may include a first processor in a first server and a second processor in a second server.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only one of A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:
1. A device comprising:
an interface circuit,
    wherein the interface circuit is arranged to access communication between at least one clients and a server,
    wherein the at least one clients comprise a first client,
    wherein the first client has a first client public key,
    wherein the server has a plurality of server public keys,
    wherein the plurality of server public keys comprises a first server public key, wherein the first client and the server execute a key encapsulation mechanism protocol so as to obtain a shared key,
wherein the client and the server are arranged to encrypt at least a portion of the communication with the shared key,
wherein the key encapsulation mechanism protocol is lattice based;
a key memory circuit,
wherein the key memory circuit is arranged to store data items,
wherein the data items indicate a plurality of server private keys,
wherein the plurality of server private keys comprises a first server private key
wherein the first client public key and the first server private key are used to form the shared key; and
a processor circuit,
wherein the processor circuit is arranged to receive at least one initiator messages of the key encapsulation mechanism protocol from the at least one clients,
wherein each of the at least one initiator messages comprises the first client public key,
wherein the processor circuit is arranged to receive at least one responder messages for each of the at least one initiator messages,
wherein each responder message comprises a server public key and encapsulation data,
wherein the server public key corresponds to the first server private key,
wherein the processor circuit is arranged to decapsulate the encapsulation data using the shared key,
wherein the processor circuit is arranged to verify that the shared key is correct,
wherein the processor circuit is arranged to decrypt at least a portion of the communication between the first client and server.

2. The device as in claim 1,
wherein key encapsulation data is obtained by encapsulating key material with an encapsulation key,
wherein the encapsulation key is derived from the first client public key and the first server private key.

3. The device as in claim 1,
wherein the processor circuit is arranged to use multiple server private keys and/or multiple client public key so as to obtain multiple shared keys,
wherein the multiple shared keys are used to provide multiple decapsulations of the encapsulation data,
wherein the processor circuit is arranged to select the correct decapsulation.

4. The device as in claim 1,
wherein at least one responder message comprises a first helper data and a second helper data,
wherein the first helper data identifies the server private key and/or the client public key,
wherein the second helper data is used verify the shared key.

5. The device as in claim 4,
wherein the first helper data comprises:
a digest of the server private key; and/or
a digest of the client public key,
wherein the second helper data comprises:
an authentication tag computed with the shared key; and/or
an encryption of the shared key.

6. The device as in claim 4 wherein the processor circuit is arranged to remove the first helper data and the second helper data from the responder message before passing the responder message to the client.

7. The device as in claim 1,
wherein verifying the shared key comprises:
storing a plurality of shared keys; selecting a first shared key, when decrypting the portion of communication.

8. The device as in claim 1,
wherein each of the at lest one initiator messages comprises a public object seed,
wherein the public object seed is arranged to generate a public object and a second public key,
wherein the second public key is related to a private key using a noisy multiplication with the public object,
wherein the processor circuit is arranged to derive the public object for a first initiator message,
wherein the processor circuit is arranged to compute at least an approximate public key for at least one private keys of the plurality of private keys,
wherein decapsulating the encapsulation data comprises:
selecting a responder message, wherein the responder message has a server public key equal or approximately equal to the computed public key; and
selecting the client public key corresponding to the first initiator message.

9. The device as in claim 1,
wherein each of the at least one initiator messages comprises an identifier,
wherein the identifier identifies the client
wherein the responder message comprises the identifier,
wherein the processor circuit is arranged to store the client public key together with the identifier
wherein the processor circuit is arranged to obtain the identifier from the responder message and retrieve the client public key using the identifier.

10. The device as in claim 1, wherein the middlebox is configured to
wherein the processor circuit is arranged to send a plurality of initiator messages to the server,
wherein each of the plurality of initiator messages comprises a public object,
wherein the indicating data is the same in each of the plurality of initiator messages,
wherein the processor circuit is arranged to receive a plurality of responder messages from the server for the plurality of initiator messages,
wherein at leas one of the plurality of responder messages comprises a server public key,
wherein the processor circuit is arranged to determine if at least two server public keys in the multiple responder messages are equal or close to each other.

11. A server comprising:
an interface circuit,
wherein the interface circuit is arranged for communication between at least one clients and a server,
wherein the at least one clients comprise a first client,
wherein the first client has a first client public key,
wherein the server has a plurality of server public keys,
wherein the plurality of server public keys comprises a first server public key,
a processor circuit,
wherein the processor circuit is arranged to execute a key encapsulation mechanism, protocol with the at least one clients so as to obtain a shared key,
wherein the processor circuit is arranged to encrypt at least a portion of communication with the shared key, wherein the key encapsulation mechanism protocol is lattice based,
wherein the key encapsulation protocol comprises:
receiving at least one initiator messages of the key encapsulation mechanism protocol from a client, wherein the first of the at least one initiator messages comprises the first client public key,
obtaining the first server private key,
generating a responder message in response to the first initiator message,
wherein the responder message comprises a server public key and encapsulation data,
wherein the server public key corresponds to the first server private key,
wherein encapsulation data comprises a shared key,
wherein the encapsulation data is encapsulated using the first client public key and the first server private key.

12. A server as in claim 11, wherein the responder message comprises first helper data and a second helper data,
wherein the first helper data identifies the server private key and/or the client public key,
second helper data is used verify that the shared key is correct.

13. A method for processing communication between at least one clients and a server, wherein the at least one clients comprise a first client, wherein the first client has a first client private key and a first client public key, wherein the server has a plurality of server private keys and a plurality of server public keys the method comprising:
accessing the communication between the at least one clients and the server,
wherein the first client and the server are arranged to execute a key encapsulation mechanism, protocol to obtain a shared key,
wherein the client and the server are arranged to encrypt at least a portion of the communication with the shared key,
wherein the key encapsulation mechanism protocol is lattice based;
storing data items,
wherein the data items indicate a plurality of server private keys,
wherein the plurality of server private keys comprises a first server private key
wherein the first client public key and the first server private key are used to form the shared key;
receiving at least one initiator messages of the key encapsulation mechanism protocol from the at least one clients, wherein the first initiator message of the at least one initiator messages comprises the first client public key;
receiving at least one responder messages for the at least one initiator messages,
wherein each responder message comprises a server public key and encapsulation data,
wherein the server public key corresponds to the first server private key;
decapsulating the encapsulation data using the shared key;
verifying that the shared key is correct; and
decrypting communication between the first client and the first server.

14. A method for communicating with at least one clients, wherein the at least one clients comprise a first client, wherein first client has a first client private key and first client public key, wherein the server has a plurality of server private keys and a plurality of server public keys the method comprising:
communicating with the at least one clients;
executing a key encapsulation mechanism, protocol with the at least one clients so as to obtain a shared key with the at least one clients;
encrypting a portion of the communication with the shared key, wherein the key encapsulation mechanism protocol is lattice based;
wherein the key encapsulation protocol comprises:
receiving at least one initiator messages from a client, wherein a first initiator message of the at least one initiator messages comprises a client public key;
obtaining the first server private key; and
generating (750) a first responder message in response to the first initiator message,
wherein the first responder message comprises a server public key and encapsulation data,
wherein the server public key corresponds to the first server private key,
wherein the first responder message comprises encapsulation data,
wherein the encapsulation data comprises a shared key,
wherein the encapsulation data is encapsulated using the first client public key and the first server private key.

15. A computer program stored on a non-transitory medium, wherein the computer program when executed on a processor performs the method as claimed in claim 13.

16. A computer program stored on a non-transitory medium, wherein the computer program when executed on a processor performs the method as claimed in claim 14.

17. The device as in claim 1,
wherein verifying the shared key comprises, estimating a distance between the shared key and the shared key used to encapsulate the encapsulation data.

18. The device as in claim 1, wherein verifying the shared key comprises:
decapsulating of the encapsulation data, wherein decapsulating comprises a rounding operation towards two or more predetermined values;
verifying that the shared key comprises summing the amount of rounding in the decapsulation, wherein decapsulating of the encapsulation data comprises an error correction part; and
verifying the shared key comprises counting the number of corrected errors in the decapsulation.

\* \* \* \* \*